US012105011B2

(12) United States Patent
Tinnea et al.

(10) Patent No.: US 12,105,011 B2
(45) Date of Patent: Oct. 1, 2024

(54) APPARATUS AND SYSTEM FOR AUTOMATED ASSESSMENT OF CATHODIC PROTECTION SYSTEM FOR PIPELINES

(71) Applicant: TITAN HRE LLC, Snoqualmie, WA (US)

(72) Inventors: Jeffrey Tinnea, Snoqualmie, WA (US); Ryan Tinnea, Snoqualmie, WA (US); Pierce Nichols, Snoqualmie, WA (US)

( * ) Notice: Subject to any disclaimer, the term of this patent is extended or adjusted under 35 U.S.C. 154(b) by 126 days.

(21) Appl. No.: 17/863,248

(22) Filed: Jul. 12, 2022

(65) Prior Publication Data
US 2023/0014791 A1    Jan. 19, 2023

Related U.S. Application Data

(60) Provisional application No. 63/205,665, filed on Jul. 12, 2021.

(51) Int. Cl.
*G01N 17/00* (2006.01)
*C23F 13/04* (2006.01)
*G01N 17/02* (2006.01)

(52) U.S. Cl.
CPC ............ *G01N 17/02* (2013.01); *C23F 13/04* (2013.01)

(58) Field of Classification Search
CPC ...... G01N 17/006; G01N 17/02; G01N 17/04; G01N 17/043; G01N 27/406
See application file for complete search history.

(56) References Cited

U.S. PATENT DOCUMENTS

| 4,351,703 A | * | 9/1982 | Winslow, Jr. | ............ C23F 13/04 |
| | | | | 205/730 |
| 5,087,873 A | * | 2/1992 | Murphy | .................... G01V 3/06 |
| | | | | 324/71.2 |

(Continued)

FOREIGN PATENT DOCUMENTS

| AU | 2017329743 A1 * | 4/2019 | .............. C23F 13/04 |
| CA | 2309693 A1 * | 5/1999 | |

(Continued)

OTHER PUBLICATIONS

English Translation of FR 3009868 (Year: 2015).*

*Primary Examiner* — Alesa Allgood
(74) *Attorney, Agent, or Firm* — Seed IP Law Group LLP

(57) ABSTRACT

A sensor system is installed adjacent to the buried or submerged metallic pipelines using a plurality of sensors and transceivers. The sensor system monitors the pipeline for external corrosion control and recommends maintenance and repair at specific locations in the pipeline where external corrosion has occurred. The sensor system automatically receives periodic or continuous measurements through the plurality of sensors. The various sensors at various locations adjacent to the pipelines detect irregularities in the received sensor data at specific locations of the pipeline. The sensor data are stored in the system database and can analyzed to be used for monitoring and for transmitting repair alerts. The sensor system according to the present disclosure provides a reliable and an accurate assessment of the external corrosions of the pipelines. The sensor system further obviates the need of personnel walking along the pipelines to detect corrosion.

22 Claims, 14 Drawing Sheets

(56) References Cited

U.S. PATENT DOCUMENTS

| | | | | |
|---|---|---|---|---|
| 5,126,654 A * | 6/1992 | Murphy | ................ | G01N 17/02 324/71.2 |
| 6,772,622 B2 * | 8/2004 | Moghissi | ................ | C23F 13/04 73/86 |
| 7,435,326 B2 * | 10/2008 | Beavers | ................ | C23F 13/00 205/726 |
| 8,133,381 B2 * | 3/2012 | Ersoy | ................ | C23F 13/04 204/196.18 |
| 10,928,299 B2 * | 2/2021 | Gluskin | ................ | F17D 5/06 |
| 11,635,366 B2 * | 4/2023 | Gluskin | ................ | F17D 3/01 702/184 |
| 2003/0169058 A1 * | 9/2003 | Pierre | ................ | G01N 17/02 324/700 |
| 2008/0047842 A1 * | 2/2008 | Beavers | ................ | C23F 13/00 205/724 |
| 2011/0238347 A1 * | 9/2011 | Gemperli | ................ | C23F 13/22 702/65 |
| 2011/0290664 A1 * | 12/2011 | Ersoy | ................ | F16L 58/00 204/196.01 |
| 2012/0279599 A1 * | 11/2012 | Gluskin | ................ | G01N 17/00 702/58 |
| 2017/0307510 A1 * | 10/2017 | Gluskin | ................ | F17D 3/01 |
| 2021/0172858 A1 * | 6/2021 | Gluskin | ................ | G01N 17/02 |
| 2023/0014791 A1 * | 1/2023 | Tinnea | ................ | C23F 13/04 |

FOREIGN PATENT DOCUMENTS

| | | | | |
|---|---|---|---|---|
| CA | 2740376 A1 * | 5/2010 | ............ | G01N 17/02 |
| CA | 2853842 A1 * | 5/2010 | ............ | G01N 17/02 |
| CA | 2904273 A1 * | 5/2010 | ............ | G01N 17/02 |
| CA | 3089176 A1 * | 8/2019 | ............ | B63B 79/10 |
| CN | 105695997 A * | 6/2016 | | |
| CN | 111156425 A * | 5/2020 | ............ | F17D 3/01 |
| EP | 2738548 A1 * | 6/2014 | ............ | G01N 17/02 |
| FR | 2983303 A1 * | 5/2013 | ............ | G01N 33/24 |
| FR | 2983582 A1 * | 6/2013 | ............ | C23F 13/04 |
| FR | 3009868 A1 * | 2/2015 | ............ | C23F 13/04 |
| JP | WO2004063737 A1 | 5/2006 | | |
| KR | 20120077999 A * | 7/2012 | | |
| RU | 2459136 C2 * | 8/2012 | | |
| WO | WO-03031686 A2 * | 4/2003 | ............ | G01R 31/12 |
| WO | WO-2012151535 A1 * | 11/2012 | ............ | F16L 58/00 |

* cited by examiner

APPARATUS AND SYSTEM FOR AUTOMATED ASSESSMENT OF CATHODIC PROTECTION SYSTEM FOR PIPELINES

BACKGROUND

Technical Field

The present disclosure relates to an apparatus, system, and method for automatically monitoring the effectiveness of cathodic protection (CP) systems of metal structures.

DESCRIPTION OF THE RELATED ART

Metal pipelines used for transporting various materials (e.g., natural gas, crude oil, water and wastewater, refined products etc.) are frequently located underground or submerged in water. These pipelines extend for millions of miles in aggregate in the US alone. Corrosion of the pipe material can and does lead to significant property losses and presents real safety risk to the public.

In order to ensure the safety of many lives as well as property, Federal safety standards are in place to govern the various aspects surrounding the transportation of natural gas and other gas by pipeline. For example, to reduce the likelihood of a pipeline failure, US Federal Law requires that pipelines are periodically tested for indications of corrosion activity.

Current test methods conforming to Federal standards and regulations involve recording measurements individually by field technicians. This work is slow, costly, and risks worker health from surrounding vehicle traffic, environmental conditions, and wildlife encounters.

BRIEF SUMMARY

A sensor system is installed adjacent to a metallic pipeline located within an electrolyte (e.g. buried in earth/soil, under water, within a cementitious matrix). This document will use buried metallic pipelines as the structure example; however, it could be installed near any metallic structure in an electrolyte including buried or submerged structures as well as metallic structures encased in cementitious material. These structures would likely be receiving cathodic protection, but the presence of cathodic protection is not a requirement for the sensor system to function or provide value.

A cathodic protection system is applied to the metallic structure to prevent corrosion on the structure. The sensor system monitors the metallic structure's corrosion potential and provides a metric indicative of the effectiveness of the cathodic protection system. According to one embodiment, the sensor system according to the present disclosure provides for maintenance and repair at specific locations in the pipeline where external corrosion has occurred; According to another potential use, the system monitors the structure's corrosion potentials at prescribed intervals providing data capable of identifying and predicting several important conditions including CP system effectiveness, locations of underprotection, interference from other structures, CP system failure, among others.

According to one embodiment, in the sensor system automatically receives periodic measurements through the transceivers and the plurality of sensors arranged. In some embodiments, the sensor system may receive measurements only during a selected time interval and may be in standby as idle until power is supplied or changed, or a request has been received to collect the measurements through the plurality of sensors.

In one or more embodiments, the sensor system detects irregularities in the received metric or sensor data through various sensors at specific locations adjacent to the structure. The sensor data are stored in the system database and can be analyzed to use for monitoring and for transmitting alerts. Further, the sensor data may be analyzed through the use of artificial intelligence (AI).

Further technical benefits of the sensor system according to the present disclosure is that it may provide a reliable and an accurate assessment of the effectiveness of the cathodic protection system that detects the external corrosions of the pipelines may also be used for protecting the metallic structure. That is, accurate and reliable data collection is ensured as compared to the manual method of collecting corrosion potential data through the use of trained operators manually recording potentials at key locations or at close intervals along the structure. The automated data collecting process of the sensor system also assists in reducing the risk of collecting erroneous data.

Moreover, because the automated data collecting process by the sensor system according to the present disclosure may collect the current status of the conditions of the cathodic protection system, immediate and real-time access to the snapshot of cathodic protection effectiveness is available. This improved report accessibility may make it possible for a prompt remedy when the pipelines or the cathodic protection system require immediate attention.

The sensor system according to the present disclosure saves cost as it obviates the need for trained operators working in the field. The sensor system further saves various costs associated with the use of operators. For example, the costs for training the operators for this particular task and the costs for dispatching these trained operators to the structure sites can be saved.

An additional technical benefit for asset owners is the rapid repeatability of the test. Combined with the accumulation of data collected over time, the sensor system according to the present disclosure may provide detailed, long-term information on the system that is not possible with manually attained data that may take days to obtain and weeks or more to process. This allows for far greater monitoring capabilities than manually obtained data and may allow asset owners to predict anomalies and act beforehand to maintain the integrity of a pipeline and reduce the likelihood of a pipeline failure.

BRIEF DESCRIPTION OF THE SEVERAL VIEWS OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
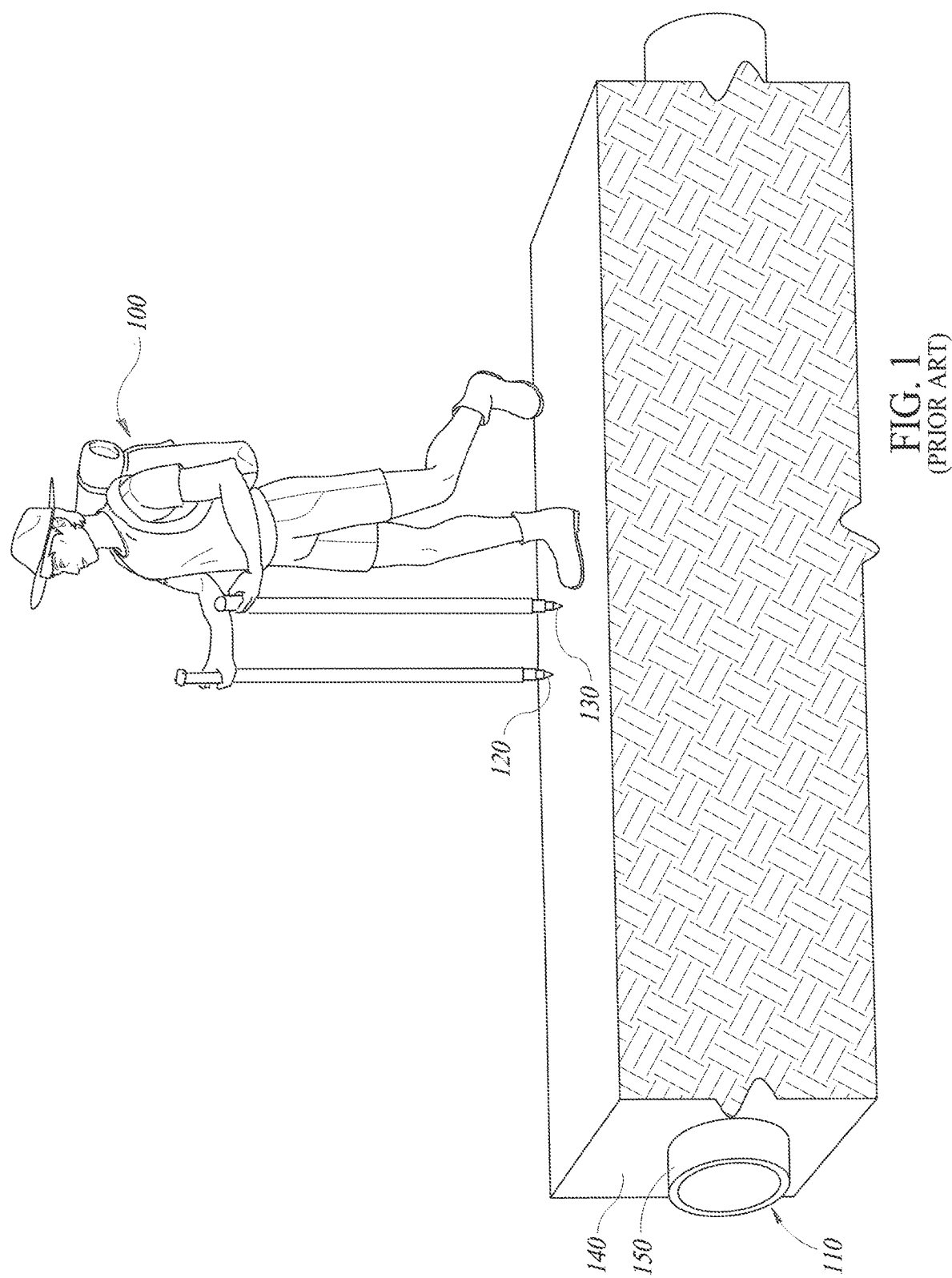
FIG. 1 shows a method of measuring voltage potential between a reference electrode and a metal pipeline/structure buried in soil in the related art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with cathodic protection (CP) systems have not been shown or described in detail to avoid unnecessarily obscuring descriptions of the embodiments.

Unless the context indicates otherwise, throughout the specification and claims which follow, the word "comprise" and variations thereof, such as, "comprises" and "comprising" are to be construed in an open, inclusive sense that is as "including, but not limited to." Further, the terms "first," "second," and similar indicators of the sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

Defining Corrosion and CP

Corrosion of material integral to the structure's function is a common cause of failure in metallic structures that are in physical contact with the earth, particularly those fully surrounded by earth. Corrosion is an electrochemical process involving metal oxidation of the pipe and mass and charge transport with an electrode via a surrounding electrolyte. The charge transport implies that an electrical current flows between locations on the structure and from the structure to one or more reference electrodes. A metallic structure that is in the ground can become an electrode and the surrounding soil, aqueous, or cementitious environment may act as an electrolyte so that the structure in that electrolyte provides the elements of an electrolytic cell.

Some corrosion arises from the naturally occurring processes at specific locations on the structure involving electrical current flow into the electrolyte via the corrosion reaction. Corrosion might be accelerated by certain local conditions, such as having a voltage applied to a local region of the structure by man-made structures, including local transit systems, power distribution systems and other terrestrial sources of drifted voltages and currents. Additional factors that add to corrosion are corrosion accelerating bacteria, soil resistivity, salinity, or the like.

Electric potential measurements are commonly used to assess the efficacy of corrosion prevention strategies. Buried metallic pipelines are protected from corrosion by a combination of cathodic protection and coatings that reduce the current requirements for cathodic protection.

Cathodic protection (CP) is a method of preventing metal corrosion by suppressing the electrochemical corrosion reaction. The metal being protected (namely, the pipeline) is forced to be a cathode by either impressing a small current upon it, or by placing it in electrical contact with a sacrificial anode, e.g., a metal that is more easily oxidized than the protected metal. These methods of CP are referred to as Impressed Current Cathodic Protection (ICCP) and Sacrificial Anode Cathodic Protection (SACP), respectively.

One of the advantages of CP is that it can provide protection without changing the immediate physical environment of the metal pipeline. CP provides the correct electrochemical conditions to control the corrosion process without requiring full access to the material to be protected, thus preserving the visual appearance and structural integrity of the metal pipeline and the other structures associated with the metal pipeline.

The methodology to ensure the integrity of the pipelines at least partially relies on close-interval surveys of on-potentials (where the CP system is connected) and off-potentials (where the CP system is disconnected). The procedure used for a close-interval survey is to place a reference electrode in contact with the soil surface above the pipe and measure the electric potential difference with respect to a connection to the pipe. Since it is impractical to connect to the pipe at each point where a measurement is taken, a length of wire is used to reach convenient connection points. The measurement location and electric potential are recorded and the next measurement is taken. The distance between measurements is controlled by a shaft encoder on the wire spool connected to the pipeline which tells the unit when to take a reading. This will be explained in connection with FIG. 1.

One or more embodiments of the present disclosure provides a sensor system that measures potentials between a reference electrode and a metallic pipeline. This potential is used to analyze the efficacy of the above mentioned CP system. Accordingly, the sensor system senses potentials at the reference electrode instead of collecting data related to the corrosion of the coatings of the pipeline or the corrosion of the pipeline itself. Details of the automatic sensor survey system will be explained in conjunction with the drawings.

Manual Close Interval Survey

FIG. 1 shows a method of measuring voltage potential between a probe and a metal pipeline buried in soil in the related art. An operator uses a reference electrode affixed to a probe 120 and 130 to measure the voltage potential between the metallic structure 110 (e.g., pipeline) and the electrodes 120, 130.

The reference electrodes 120 and 130 are connected via wires to the negative terminal of a voltmeter. The metallic structure 110 is connected via high gauge wire spooled in a backpack 100 to the positive terminal of the voltmeter. A potential is measured between the reference electrode 120 and 130 and the surface of the metallic structure 150 through the electrolyte 140.

Voltage readings are often automatically obtained as the inspector walks and wire unspools from the backpack 100. By using two reference electrode probes 120 and 130, it can be assured that one reference electrode is in contact with the electrolyte continuously during the inspection. Data is collected onto a logging device which is typically paired with the voltmeter recording the potentials. After the inspection, the data is manually removed from the device and analyzed.

The method in the related art required operators to walk along the metallic structure 110 and assess the condition of the metallic structure 110. The operators would take manual readings using the probe 120 and 130. This method of collecting potentials manually is time-consuming, cost intensive, labor intensive, and inaccurate. It can also be dangerous as it often involves work around high voltage systems, extreme weather, animal encounters, and high-speed traffic.

Overview of the Apparatus and System

Figure 2:
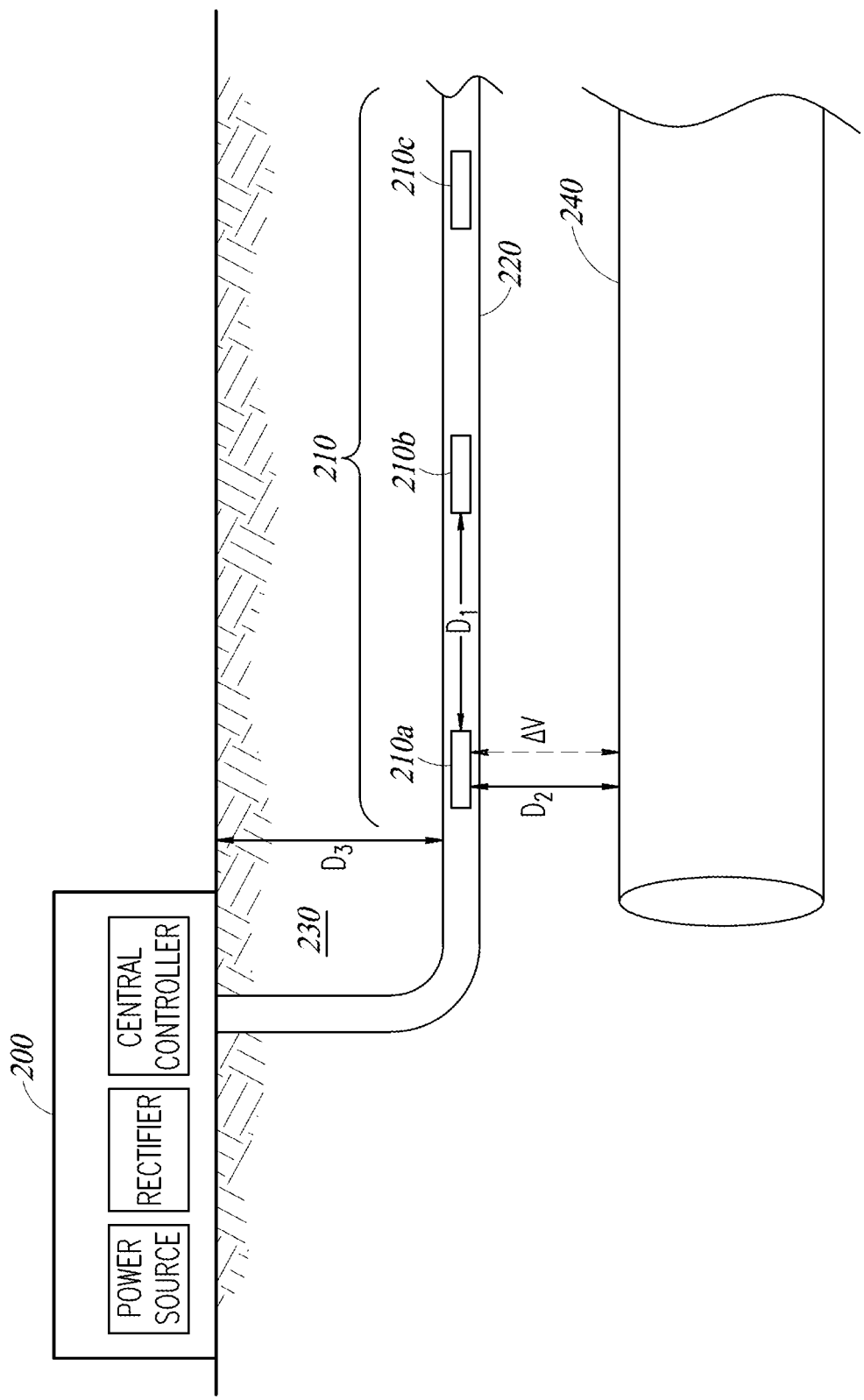
FIG. 2 is schematic overview diagram of a sensor system according to one or more embodiments of the present disclosure.

FIG. 2 is schematic overview diagram of a sensor system (or an automated sensor survey system) according to one or more embodiments of the present disclosure. In FIG. 2, a head node 200 or a computer processor assembly 200 is connected to one or more reference nodes 210 (e.g., a first reference node 210a, a second reference node 210b, a third reference node 210c, or the like) placed along an electrical data bus 220. The reference node can also be referred to as a reference sensor assembly 210. In some embodiments, the electrical data bus 200 includes a cable structure such as an electrical coaxial cable, CAT6, fiber optic cable, WiFi, LoRaWAN, NB-IoT, 4G, or any type of wired or wireless electrical data bus. In one embodiment, the computer processor assembly 200 is coupled to one end of the electrical data bus 220. The electrical data bus 220 includes a data-carrying wire.

In some embodiments, the computer processor assembly 200 includes a central controller, a power source, and a rectifier. However, in other embodiments, some of the components may be further added and yet in other embodiments, some of the components listed may be omitted. For example, the rectifier may be omitted or it may be present but at a remote location from the computer processor assembly 200.

The reference nodes 210 (also called a reference sensor assembly) and the electrical data bus 220 are buried or submerged in a medium 230 (e.g., native soil, water, or the like). The plurality of reference nodes 210 are placed in a prescribed proximity and configuration to the protected structure 240. The protected structure 240 may be any type of partially or fully metallic structures including metal pipelines, storage tanks, steel-reinforced concrete structures, seawalls, bridges, buildings, or transportation systems. In one or more embodiments, the transporting structure 240 may be referred to as metal pipelines 240. The fluid being transported or stored could be oil, natural gas, propane, or any petroleum product, and which could be in any fluid form including liquid, gas, a pressurized gas, a liquefied gas or any other fluid form.

The reference nodes 210 are spaced apart from each other at a selected distance. For example, the first reference node 210a and the neighboring second reference node 210b may be spaced apart from each other at a selected distance $D_1$. In some embodiments, each of the neighboring reference nodes may be spaced apart from each other evenly throughout out the electrical data bus 220. That is, the third reference node 210c and the neighboring second reference node 210b may be spaced apart from each other at a selected distance $D_1$. Further, a fourth reference node (not shown) may be spaced apart from the third reference node 210c at a selected distance $D_1$. However, in other embodiments, each of the neighboring reference nodes may be spaced apart at a different distance throughout out the electrical data bus 220. For example, the first reference node 210a and the neighboring second reference node 210b may be spaced apart from each other at a selected distance $D_1$ but the second reference node 210b and the neighboring third reference node 210c may be spaced apart from each other at a distance different from distance $D_1$.

In some embodiments, the distance $D_1$ may be selected to conform to the Federal safety standards (e.g., Pipeline and Hazardous Materials Safety Administration or PHMSA). For example, the spacing between the adjacent reference electrodes (e.g., spacing between the first reference node 210a and the second reference node 210b) is selected to be less than 6 meters (20 feet). The reference nodes 210 may be positioned adjacent to, but a short selected distance from the metal pipeline 240. In some embodiments, the distance between the first reference node 210a and the metal pipeline 240 is distance $D_2$. Any selected distance $D_2$ may be employed that ensures the operation of detecting the voltage potential difference between the first reference node 210a and the metal pipeline 240. For example, at the first reference node 210a, the first reference node 210a measures a voltage difference $\Delta V$ between a reference electrode in the first reference node 210a and the metal pipeline 240 through the medium 230 which serves as an electrolyte. Native soil may include not only soil but also sand, rock, clay, water, concrete, or the like. That is, the voltage difference $\Delta V$ is measured by forming an electrochemical circuit.

In some embodiments, the distance between the second reference node 210b and the metal pipeline 240 and the third reference node 210c and the metal pipeline 240 may be identical or substantially identical to distance $D_2$. However, in other embodiments, the distance between the third reference node 210c and the metal pipeline 240 or the distance between the second reference node 210b and the metal pipeline 240 may be different from distance $D_3$. That is, the distances between the metal pipeline 240 and each of the reference nodes may be different from each other in other embodiments.

In one embodiment, distance $D_2$, a distance from the reference node 210 (or the reference electrode) to the metal pipeline 240 may be between about 2 cm to 2.2 meters (1 inch to 7 feet).

In some embodiments, the electrical data bus 220 is positioned closer to the metal pipeline 240 than a top surface of the medium 230 adjacent to ambient air. There is a distance $D_3$ from the top surface of the soil 230 to the reference nodes 210. It is preferred that the distance $D_3$ is sufficiently great that traffic, whether foot or vehicle traffic, directly on the soil surface will not compress or affect the electrical data bus 220. The porous plug of the reference electrodes on the reference nodes 210 must be slightly spaced apart from the metal pipeline 240 and not directly contacting the metal pipeline 240, but adjacent to it. This is because, it is necessary to have a space for the medium 230 so that it can serve as an electrolyte to form an electrochemical circuit. In some embodiments, the electrical data bus 220 or the reference nodes 210 may be physically attached to the structure so long as the semi-porous plug for the reference electrode is spaced at a distance $D_2$.

The sensor system according to the present disclosure, in operation, supplies the computer processor assembly 200 the electrical data bus 220 with power through the power source and the reference nodes 210 are powered accordingly and obtain a potential reading between the reference electrode in the reference node 210 and the protected structure 240. The voltage difference between the reference electrode in the first reference node 210a and the metallic metal pipeline 240 can be sensed at the first reference node 210a. In some embodiments, this voltage difference measured at the first reference node 210a by the sensor system can be interpreted to indicate the effectiveness of the cathodic protection system on the pipeline. That is, the sensor system measures how much the metal pipeline 240 polarizes as a result of that cathodic protection.

The cathodic protection system, not shown since it is known in the art, protects the metal pipeline 240 from corrosion of its metal surface. That is, the cathodic protection systems mitigate corrosion of metallic objects such as the metal pipeline 240 that are partially or wholly submerged in a medium 230 where they are exposed to corrosive electrolytes. For example, points or sections on the metal pipelines 240 immersed subsea or buried under the earth's surface can experience an electric potential difference from other portions of the metal pipeline 240 because of characteristics in the medium 230, or differing characteristics in the metal pipeline 240 itself. Corrosion results from this potential difference which causes electron flow between the metallic pipeline sections of different potential within the metal pipeline 240.

To be specific, cathodic protection involves placing an anodic material in the common electrolyte 230 with a corroding metallic surface and providing an electrical connection between the anodic material and the corroding metal of the anode. The surface that is more anodic experiences corrosion, and the surface that is less anodic (or more cathodic) does not corrode. For example, the surface of the metal pipeline 240 then becomes more negatively polarized than it previously was. The steel surface in this condition is cathodic relative to the anode material. If correctly applied, all corrosion occurs from the anode material. Therefore, here in FIG. 2, an anode is connected to the metal pipeline 240, thereby making the metal pipeline 240, a cathode. The anode is what corrodes in this configuration which thereby prevents the corrosion of the metal pipeline 240.

Cathodic protection can also be achieved through the application of an external direct current (DC) power source to the circuit. This is most commonly achieved through transformer-rectifiers which convert readily available alternating current to DC for the CP system. The effectiveness of the cathodic protection system can be confirmed by measuring the polarized potential of the protected metallic object (e.g., metal pipeline 240) relative to a reference electrode (e.g., reference node 210) that is set in the electrolyte 230 as shown in FIG. 2.

For example, the corrosion potential can be measured when the current is being impressed onto the protected metallic object (referred to as on potential) and then measured when it is not being impressed (referred to as off potential). The resistance of the medium 230 (e.g., soil or water) and protected metal pipeline 240 introduce a measurement value (sometime called the IR error) due to a corresponding voltage drop from the resistance based on the V=IR relationship (V: voltage drop, I: current: R: resistance). Interrupting the current supply to the protected metal pipeline 240 and instantaneously measuring the potential between the protected metal pipeline 240 and the reference node 210 (referred to as instant off potential) yields a value that is void of IR error.

Because of Federal regulations, metal pipelines containing flammable or explosive liquids or gasses must provide evidence of corrosion protection (most commonly achieved through a combination of cathodic protection and coating systems). The sensor system according to the present disclosure provides an automated monitoring system to provide testing of in-situ cathodic protection on the target metal pipeline 240. While it is known to conduct close interval surveys, direct current voltage gradient surveys, and other frequently performed cathodic protection testing on buried pipelines by people walking above ground, with various test equipment being carried with them, this inventive technique and structure provides for testing of the metal pipeline at regular intervals, even automatically, and at a very low cost. It also avoids operator error, a significant potential problem when testing is carried out by poorly trained individual walking above ground. The inventive technique produces measurements taken of the potential (voltage) difference between the metal pipeline 240 and a reference node 210 in contact with the electrolyte 230. The data collected during a close interval survey of the sensor system can provide insight such as the effectiveness of the cathodic protection in place.

There are many ways to measure the effectiveness of the cathodic protection system and various different organizations and government agencies have their different standards. The present invention permits testing to be carried under many of these different standards, providing a significant benefit. Accordingly, the reference nodes 210 of the sensor system may be suitably adjusted to conform to any of these various standards provided by the organizations and government agencies.

One of many ways indicative of a cathodic protection system fully achieving protection is to measure a polarized potential of a metal pipeline. For example, this polarized potential is measured relative to a certain type of reference electrode. This involves reading the pipe-to-soil voltage at each reference electrode locations along a metal pipeline with cathodic protection rectifiers immediately turned off. According to the inventive structure, circuits and techniques, the pipeline 240 can be tested making use of the reference nodes 210, along with the other circuits to accomplish each of these tests and provide results, which is a significant benefit.

When the measurement shows that a polarized potential is more negative than an established threshold which is indicative of a protected potential, then the cathodic protection system is operating properly and achieving protection. In one or more embodiments, the absolute value of the polarized potential may vary based on the type of materials used for the reference electrode. However, for a particular type of reference electrode, there may be a polarized potential that indicates that the cathodic protection system is achieving protection.

Another way indicating that a cathodic protection system is properly achieving protection is to measure the shift in the potentials. For example, using the present invention, the polarized potential of the metal pipeline 240 may be measured before activating or applying the cathodic protection to the metal pipeline 240. This process will produce a first measurement value. Then, the polarized potential of the metal pipeline 240 may be measured after applying the cathodic protection to the metal pipeline 240. Similarly, this process will produce a second measurement value. Accordingly, the shift in the potentials may be determined based on the difference between the first measurement value and the second measurement value. When the measurement shows that a structure's corrosion potential has shifted more negative than an established threshold, then the cathodic protection system is operating properly and achieving protection.

Thus, as explained above, in the cathodic protection system that is protecting the metal pipeline 240 from corrosion of its metal surface, a predetermined value or a selected value (e.g., voltage, potential) indicative of the effectiveness of the cathodic protection system may be obtained.

In one embodiment, after the potentials are obtained at each of the reference nodes 210, the values are compared to previous data and nearby sensor node 210 data to evaluate accuracy and functionality of individual sensor nodes 210.

In one embodiment, the reference nodes 210 are buried and remain there in idle mode until the computer processor assembly 200 supplies power to the reference nodes 210 for retrieving data collected at the reference nodes 210.

The reference nodes 210 can also be configured to gather voltage readings at that particular location continuously, periodically, or intermittently over a selected period of time. The system can be programmed to provide power at selected time intervals or to keep them powered at all times. In addition, the system can be kept idle until it is specifically instructed to turn on or is manually turned on by a local operator. When the reference nodes 210 receive a request from the computer processor assembly 200 to report back its data (in some embodiments, the nodes can report data based on a schedule, event, or continuously rather than by request), the data are transferred to the computer processor assembly 200 via the electrical data bus 220. In one or more embodiments, each reference node is individually addressable so that the computer processor assembly 200 can request data in any order.

Further, because the sensor system according to one or more embodiments of the present disclosure measures whether the cathodic protection system is working at a particular location (e.g., the location where the reference node is positioned), it is possible to identify and react to any shortcomings of the cathodic protection system in real-time or substantially in real-time and avoid any potential damages to property and life.

While the electrical data bus 220 having the reference nodes 210 are shown in FIG. 2 as being arranged above the metal pipeline 240, this is merely shown as an example. For example, the electrical data bus 220 may be arranged under the metal pipeline 240. In another example, the electrical data bus 220 may be arranged side by side in a parallel manner to under the metal pipeline 240. Any other positions adjacent to the metal pipeline 240 may be utilized. Other embodiments could be configured in grid or mesh patterns inside concrete structures, grid or spiral patterns under above ground storage tank footings, in a mesh pattern inside fire water tanks, among other configurations.

In some embodiments, the reference nodes 210 are not directly on the metal pipeline 240. For example, in order to have an electrolyte 230 between the reference node and the metal pipeline 240, distance $D_2$ may be a distance that is larger than 0. In these embodiments, for example, distance $D_2$ may be greater than 2 cm. A distance $D_2$ that is greater than 3 cm and less than 1 meter is preferred. However, other different distances $D_2$ may be utilized based on the environment surrounding the metal pipeline 240, such as submerged structures in vicinity of the metal pipeline 240 including concrete, minerals, rocks, etc. The details of the computer processor assembly 200 and the reference node 210 will be explained in the following figures.

Reference Node Composition

Figure 3:
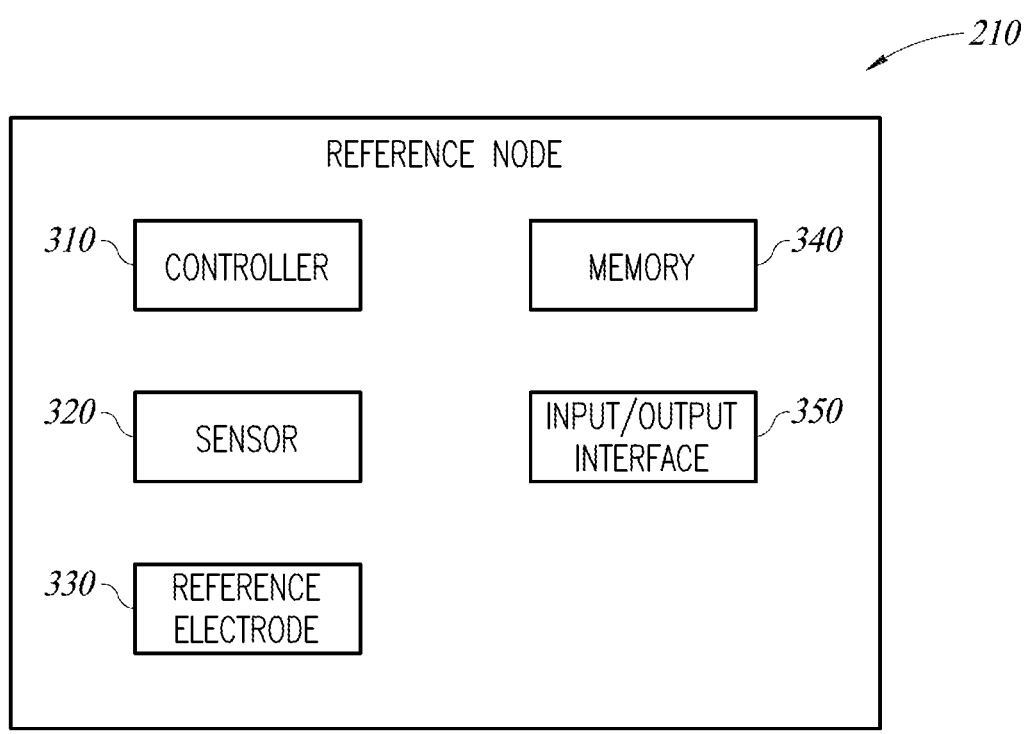
FIG. 3 is a block diagram of a reference node according to one or more embodiments of the present disclosure.

FIG. 3 is a block diagram of a reference node according to one or more embodiments of the present disclosure.

In one or more embodiments, the reference node 210 includes a controller 310, a sensor (or one or more sensors) 320, a reference electrode (or one or more reference electrodes) 330, memory 340, and an input/output interface 350. The reference node 210 is also referred to as a reference sensor assembly 210. In one embodiment, the reference sensor assemblies 210 are closer to the metal structure 240 than the boundary of the electrolyte (e.g. the surface of the earth). The controller 310 includes a processing circuitry such as a microprocessor, microcontroller, integrated circuit, chip, microchip, processing units, logic circuits or the like. The sensor 320 is configured to detect and sense the voltages in connection with the reference electrode 330. In some embodiments, the sensor 320 and the reference electrode 330 may be operatively coupled to each other. However, in other embodiments, the reference electrode 330 may be implemented within the sensor 320 and not as a separate component. In some embodiments, reference electrode 330 includes electric potential sensing electrodes.

In one or more embodiments, the sensor 320 and/or the reference electrode 330 may be located or housed outside the reference node 210 enclosure. In one embodiment, the reference node 210 would contain one reference electrode 330 and a second reference electrode 330 would be placed at a known distance from the reference node 210. In this way, a common corrosion engineering test called a direct current voltage gradient survey could be performed.

The memory 340 stores the data collected from the sensor 320 using the reference electrode 330. The memory 340 may include any suitable memory that is capable of storing recorded data. For example, a storage device used may be a static random access memory (SRAM). When the sensor system according to the present disclosure is powered from the computer processor assembly 200, the sensor 320 collects data during a certain period of time and the SRAM retains data values. These data stored in the memory 340 is retrieved through the electrical data bus 220 and retrieved at the computer processor assembly 200. The memory 340 may also store computer programs or other instructions for loading into the controller 310 such as updating software, data filtering or analysis software, geolocation data, or data from additional sensors. In one or more embodiments, memory may be contained onboard the controller 310. In implementations where the reference electrode 330 or sensor 320 are not physically contained in the reference node 210, additional memory may be needed at those locations.

The input/output interface 350 includes various connections within the reference node 200, connections with the neighboring reference nodes and the electrical data bus 220, as well as other connections necessary for communicating data with the computer processor assembly 200 through the electrical data bus 220. In some embodiments, the input/output interface 350 includes a data input/output interface and power supply interface. For example, some of the electrical connections or lines may be both used to transmit data as well as power. In these embodiments, because the power is supplied to the reference node 200 through a data line, a separate line such as a power line may not be included. However, in other embodiments, a data line configured to transmit and receive data and a power line configured to supply power to the various components within the reference node 200 may be separately implemented.

The input/output interface 350 includes electrical connections for sending collected data back to the computer processor assembly 200 through the electrical data bus 220.

In one or more embodiments, the power source for the reference node 210 may be supplied through the electrical data bus 220 from the computer processor assembly 200. When the computer processor assembly 200 supplies power to the reference nodes 210 through a power source coupled to the computer processor assembly 200, the reference nodes 210 along the electrical data bus 220 are activated. With the power supplied to each of the components of the reference node 210, the sensor 320 measures the voltage between the reference electrode 330 and metallic structure 240. The voltage data collected at each of the reference nodes 210 are stored in the respective memory 340 of each reference node 210. For example, the voltage data collected at the first reference node 210a is collected in a memory within the first reference node 210a. Similarly, the voltage data collected at the second reference node 210b is collected in a memory within the second reference node 210b and the voltage data collected at the third reference node 210c is collected in a memory within the third reference node 210c.

The computer processor assembly 200 is configured to retrieve the data collected from each of the reference node 210 individually or collectively in any order. For example, the computer processor assembly 200 may send out a request for retrieving data stored in the second reference node 210b and only the second reference node 210b. In this case, the data stored in the first reference node 210a and the third reference node 210c may be stored in their respective memories but may not be retrieved by the computer processor assembly 200. In another example, the computer processor assembly 200 may send out a request for retrieving data stored in all of the reference nodes 210 along the electrical data bus 220. That is, the data from the first, second, and third reference nodes 210a, 210b, 210c may be collected subsequently or simultaneously. In yet another example, the computer processor assembly 200 may send out a request for retrieving data stored in the order of the second reference node 210b, the third reference node 210c, and the first reference node 210a. That is, each of the reference nodes 210 are identifiable by an address scheme and the computer processor assembly 200 may locate and identify each of the reference nodes via the address scheme and collect the data from the first, second, and third reference nodes 210a, 210b, 210c in any order. Communication between the computer processor assembly 200 and reference nodes 210 is not limited to an addressed request model. As such, in one or more embodiments the reference nodes 210 may push data to the computer processor assembly 200, or send data on a schedule, or send data continuously, or other digital communication paradigms.

When the power from the computer processor assembly 200 is not supplied to the reference nodes 210, the reference nodes 210 sit buried under the medium 230 adjacent to the transporting structure 220. For example, the reference nodes 210 may idly stay buried at that location. However, when the power is supplied, the reference nodes 210 collect data for a set period during the power is on and stores the voltage data in memory. The computer processor assembly 200 may collect the voltage data stored in the memory of the reference nodes 210 before power is turned off. When the power is turned off, because the memory, in some embodiments, are volatile memory such as an SRAM, the previously collected data is erased and the newly collected data will be stored in the memory when the power is supplied in the next term.

The data can be collected at the computer processor assembly 200 any time and for any period of time. Quantity and speed of returned readings can be carried by any acceptable processor at a rate it can provide based on its memory, data transmission speed, processing power, speed, and other system parameters. Accordingly, the operation of the sensory system of the present invention may be carried out to accommodate any regulatory requirements.

Reference Node Circuits

Figure 4A:
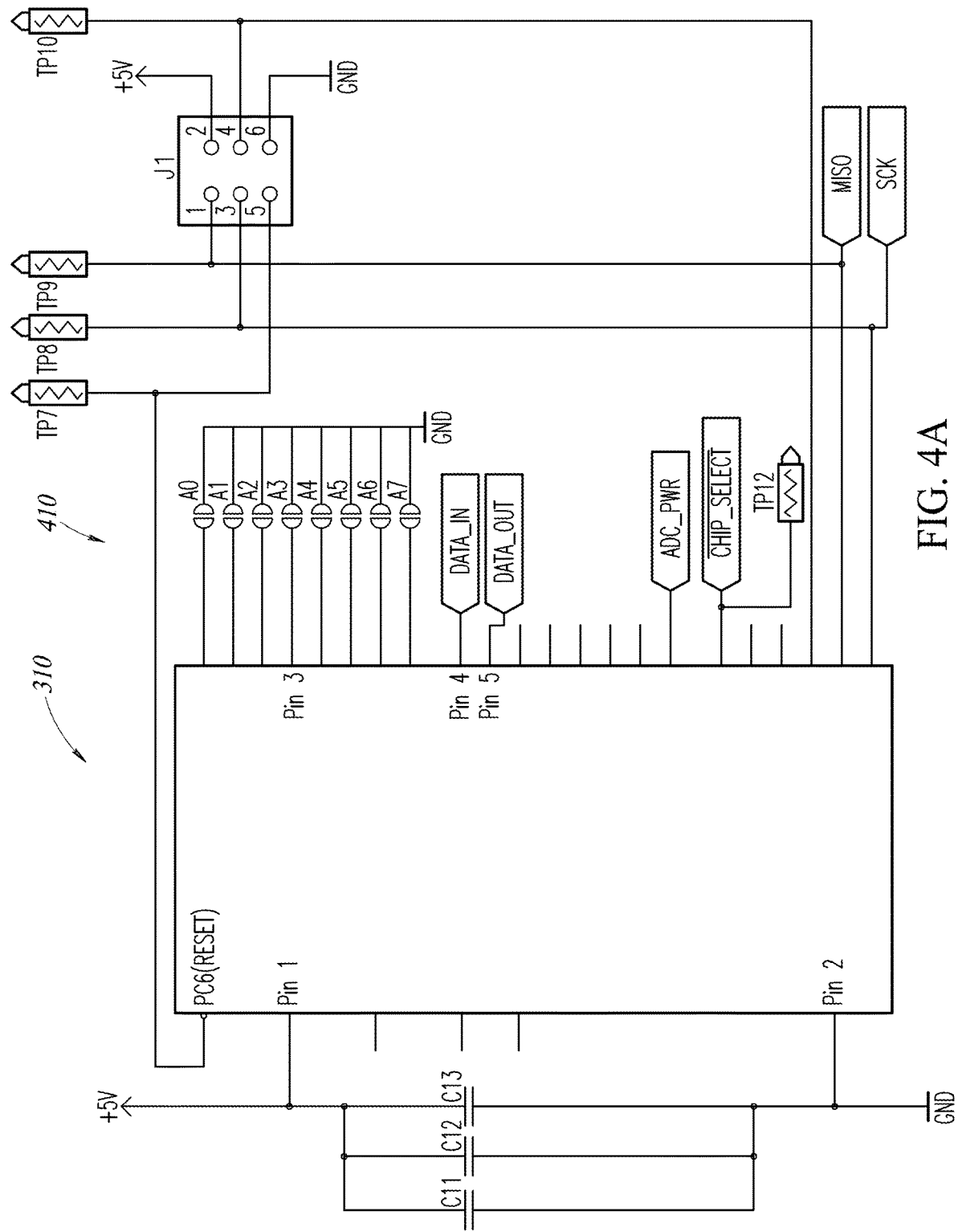
FIG. 4A is a schematic circuit diagram of a controller of a reference node according to one embodiment of the present disclosure.

FIG. 4A is a schematic circuit diagram of a controller of a reference node according to one embodiment of the present disclosure. There are many different possible circuits, structures and designs for a reference node 210 according to the invention and FIG. 4A provides one acceptable example of those that could be made according to the principles of the present invention.

A controller 310 may have various pins for connecting to the other components within the reference node 210 as well as components connected with the reference node 210. The controller 310 includes a first pin that is connected to a voltage source VCC. A pin used herein may include one pin or a set of pins. The fact that a singular form was used does not indicate that there is only a single pin. For example, there may be several pins that are connected to the voltage source VCC. In some embodiments, the value of the voltage source VCC may be set to +5V. However, other voltage levels may be utilized based on the design of the circuit.

The controller 310 further includes a second pin that is connected to a ground GND. Similarly, there may be one or more second pins that are connected to the ground GND. Further, in some embodiments, there may be an analog GND and an electrical GND. In some embodiments, one or more capacitors $C_{11}$, $C_{12}$, $C_{13}$ may be connected between the first pin which is connected to the power source VCC and the second pin which is connected to the ground GND. In some embodiments, the value of the capacitors $C_{11}$, $C_{12}$, $C_{13}$ may be set to 100 nF. However, other capacitance levels may be utilized based on the design of the circuit.

The controller 310 includes a third pin that is connected to an electrical component 410 that provides addresses for each of the reference node 210. The third pin may include one or more pins or a set of pins that are connected to the electrical component 410. In one embodiment, the electrical component 410 includes solder jumpers A0-A7 to individually set the address of each reference node. In other embodiments, the address of each reference node is controlled in software. With this addressing scheme employed, each of the reference node 210 may be able to communicate with the computer processor assembly 200 and transfer data stored in the reference node 210. As explained before, by utilizing this address scheme, the computer processor assembly 200 may request to retrieve data from specific reference nodes, for example, the second reference node 210b. Similarly, the computer processor assembly 200 may request to retrieve data from, for example, the third reference node 210c instead of the second reference node 210b or from multiple or all nodes at once. The other end of the electrical component 410 may be connected to ground GND. In other embodiments, the electrical component 410 may be further added so that these additional reference nodes added along the electrical data bus 220 may be identifiable using an address (e.g., by adding more bits). The electrical component 410 may be configured to provide each of the reference node 210 with an address. Addressable space for reference node quantities would match demand as needed to meet the system design. For example, one embodiment may have 1000 reference nodes operated by a single controller 310 along a pipeline.

The controller 310 includes a fourth pin DATA_IN that receives data collected from the sensor 320 and a fifth pin DATA_OUT that transmits data collected to the computer processor assembly 200 through the electrical data bus 220.

Figure 4B:
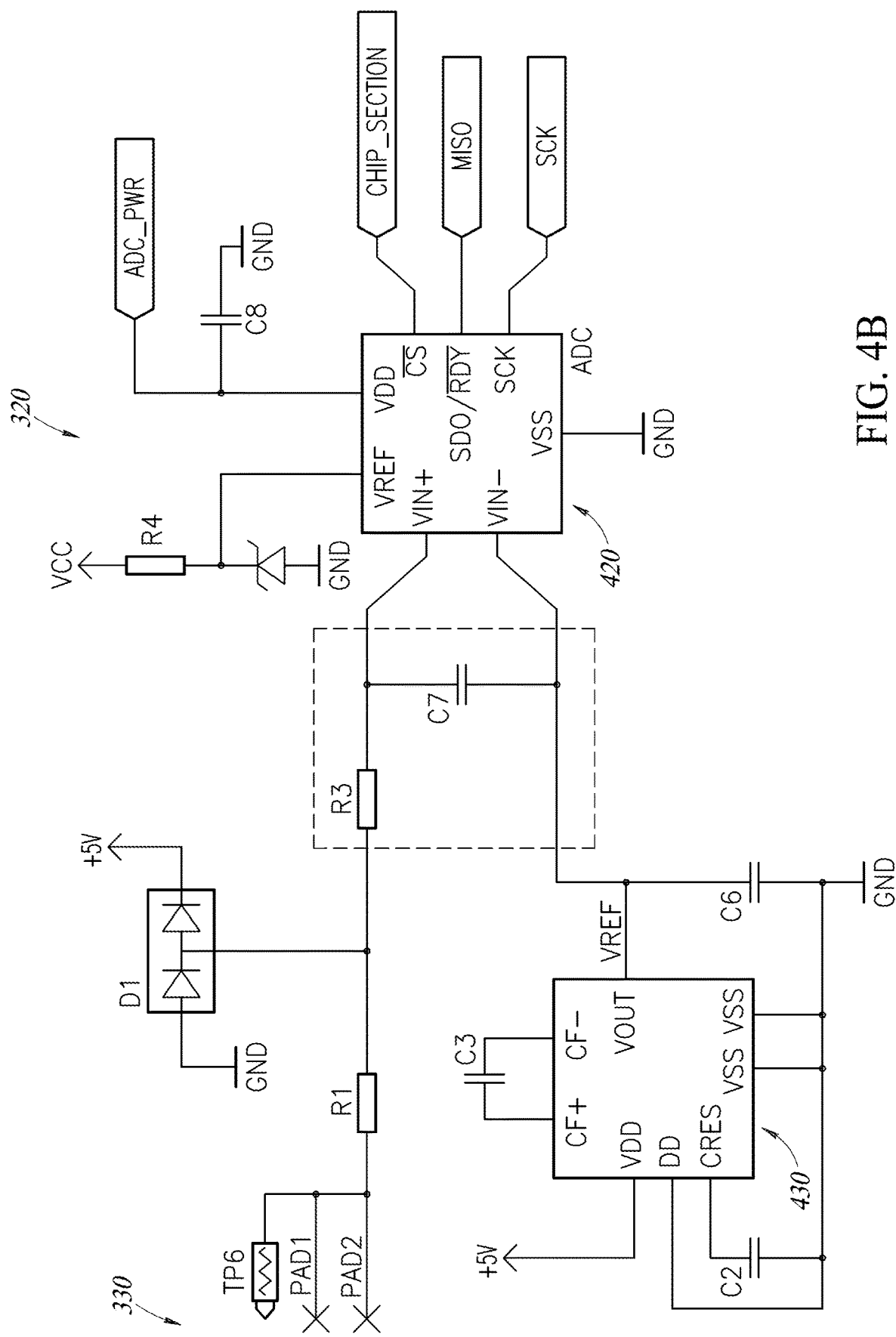
FIG. 4B is a schematic circuit diagram of a sensor of a reference node according to one embodiment of the present disclosure.

The controller 310 includes a sixth pin that supplies power to an analogue-to-digital converter (ADC) (shown in FIG. 4B). In some embodiments, the ADC draws reduced or minimal power. Accordingly, the controller 310 may supply power to the ADC. In some embodiments, the ADC may wait until the controller 310 is supplied with power and once the controller 310 is sufficiently powered, the ADC may be turned on subsequently.

The controller 310 may include additional pins as needed. That is, the controller 310 may include additional pins that are not shown in the drawings for the controller 310 to properly operate based on the functions described in the present disclosure.

In one or more embodiments, each reference node 210 (or sensor node) has a local board (e.g., controller 310) that is digitizing the data and transmitting it back to the computer processor assembly 200. For example, each reference node 210 starts recording data when it is powered up and it stops recording data when the computer processor assembly 200 requests to stop. The computer processor assembly 200 may subsequently ask each reference node 210 to transmit the data that each reference node 210 recorded so far.

To further elaborate, the computer processor assembly 200 may turn the power on for the electrical data bus 220 and the reference nodes 210 on the electrical data bus 220. All the reference nodes 210 on the electrical data bus 220 gathers data for some selected period until these reference nodes 210 are instructed otherwise from the computer processor assembly 200. The computer processor assembly 200 may request the first reference node 210a to provide the data recorded from the first reference node 210a and all of the other reference nodes including the first reference node 210a may stop recording voltage data at that point. In one or more embodiments, it is beneficial to stop the data recording process when retrieving data because the ground GND may be unstable partially due to the results of the communications between the computer processor assembly 200 and the reference nodes 210. Collecting data recorded during this time may lead to inaccurate voltage readings, thus, it is beneficial to stop the data acquisition process at this point.

The data are stored in the memory 340 that resides within each reference node 210. The memory 340 stores only data during operation cycle and does not have to store data between operational cycles. For example, the computer processor assembly 200 may power on the reference nodes 210 and the reference nodes 210 may collect data during the operation cycle when the reference nodes 210 are powered on. When the reference nodes 210 are powered off, the operation cycle halts and no data is collected from the reference nodes 210 during the non-operation cycle. However, when the reference nodes 210 are powered on again, the data from the reference nodes 210 may be collected during the next operation cycle.

In some embodiments, the memory 340 stores the maximum value of voltages and the minimum value of voltages over a selected period of time.

In one or more embodiments, the reference node 210 including the memory 340 has to be buried at the same time as and with the electrical data bus 220. Accordingly, longevity and stability are desired. In one operation of the reference node 210, old data (for example, data collected from the previous operation cycle) may not be stored locally in the memory 340. For example, the memory 340 may include volatile memories such as an SRAM. SRAM is volatile but if the sensor system is powered, SRAM retains data values without recharging cells. Thus, when the memory 340 is powered, the memory 340 will rewrite new data on the memory 340. Here, new data will be collected by the reference node 210 when powered, and the computer processor assembly 200 may collect the data recorded by the reference node 210. The computer processor assembly 200 may have a separate local memory that receives all the data from the previous operation cycle and the current operation cycle. In one or more embodiments, the reference node 210 may be powered up and collect data according to the relevant regulatory requirements.

FIG. 4B is a schematic circuit diagram of a sensor 320 of a reference node 210 according to one embodiment of the present disclosure. There are many different possible circuits, structures and designs for a sensor 320 according to the invention and FIG. 4B provides one acceptable example of the many that could be made according to the principles of the present invention.

The sensor 320 includes an Analog to Digital Converter (ADC; 420). The ADC 420 includes a first pin (e.g., Vin+ pin) and a second pin (e.g., Vin– pin). The second pin of the ADC 420 is connected to a reference generator 430. In some embodiments, the reference generator 430 produces a negative reference voltage, slightly below the local ground GND. The use of the negative reference voltage is to compensate for some resistance in the ground. For example, the negative voltage reference provided to the second pin may be between about –200 mV to –300 mV. In some examples, the negative voltage reference may be set to –233 mV depending on the design of the circuit. However, other voltage references below the local ground 0V may be utilized. The reference generator 430 generates a voltage reference Vref into the second pin of the ADC 420.

The first pin of the ADC 420 receives the data connected from the sensors PAD1, PAD2 (or the reference electrodes 330). The ADC 420 receives the voltage data from the first pin and the second pin and measures the difference between the first pin and the second (e.g., Vin+−Vin−) and reads the voltage data.

As shown, the reference electrodes 330 are connected with a resistance R1 and a resistance R3. Between the two resistances, a diode D1 is connected. One end of the diode D1 is connected to the ground GND and the other end is connected to the power source +5V. In some embodiments, the order of the resistance R1 and R3 may range from 1 kΩ to 100 kΩ. However, other values may be utilized based on the circuit design. For example, the resistance of R1 may be 1 kΩ and the resistance of R2 may be 80 kΩ.

A capacitor C7 may be connected between the first pin and the second pin of the ADC 420 to form an RC circuit. In one embodiment, the capacitance of C7 may be 100 nF. However, other values may be utilized based on the circuit design.

In the reference generator 430, the VDD pin is connected to the power source +5V. The VSS pin is connected to the ground GND. A capacitor C6 is connected between the Vout pin which outputs the voltage reference Vref and the VSS pin. The CRES pin is connected to the ground GND through a capacitor C2. Further, an additional capacitor C3 is connected between the CF+ pin and the CF− pin.

In the ADC 420, the VDD pin is connected to the sixth pin of the controller 310. That is, the ADC 420 receives power supply from the controller 310 through the VDD pin. The VDD pin is also connected to the ground through a capacitor C8. The CS pin is connected to the CHIP_SELECT pin of the controller 310. The SDO/RDY pin is connected to the MISO pin of the controller 310 and the SCK pin is connected to the SCK pin of the controller 310.

The ADC 420 and the reference generator 430 may include additional pins as needed. That is, the ADC 420 may include additional pins that are not shown in the drawings for the ADC 420 to properly operate based on the functions described in the present disclosure. Similarly, the reference generator 430 may include additional pins that are not shown in the drawings for the reference generator 430 to properly operate based on the functions described in the present disclosure.

Further, additional electrical connections and additional electrical components may be further added to the described circuit. The circuits are merely for examples and other connections and components may be utilized.

Figure 4C:
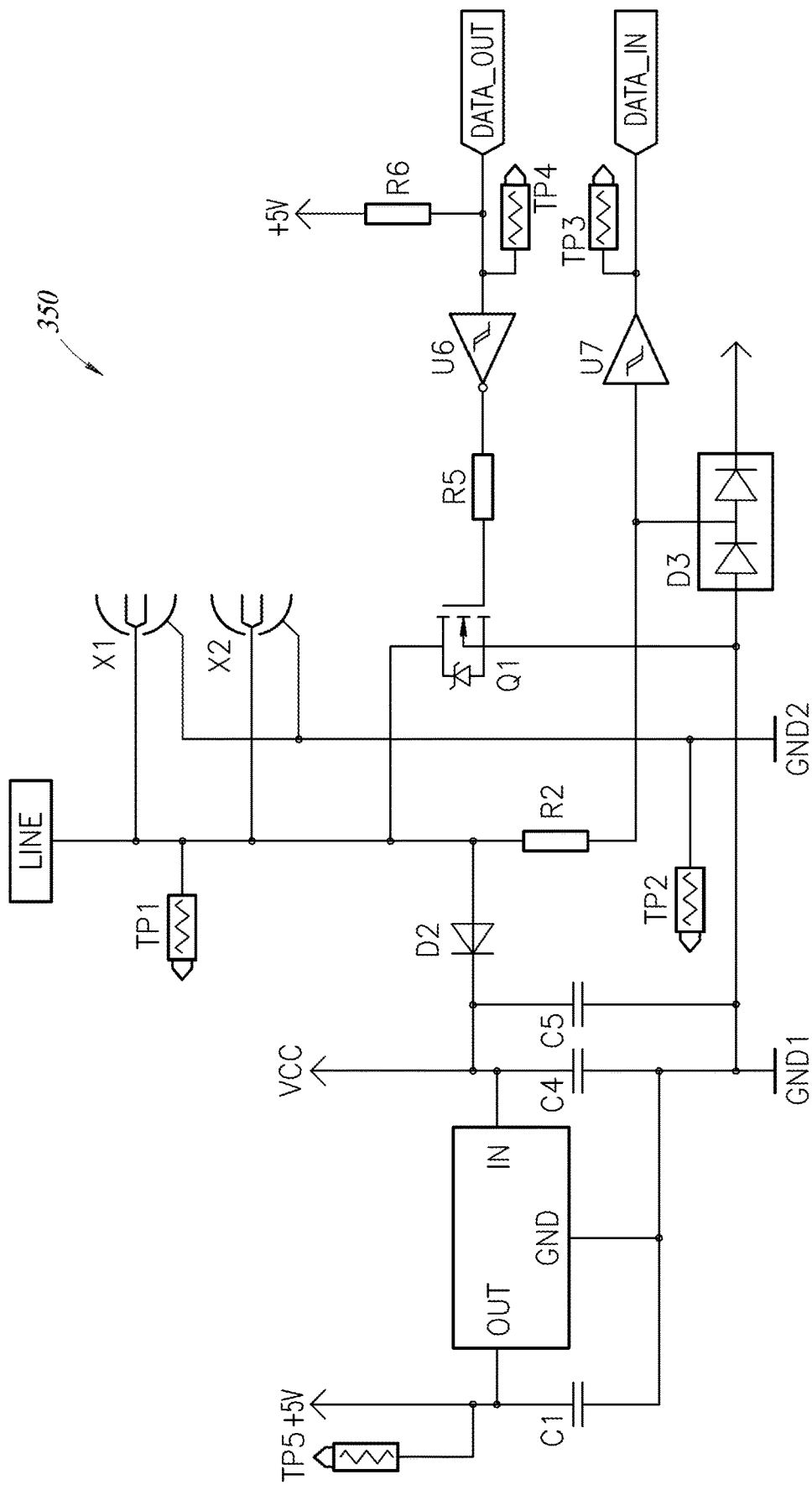
FIG. 4C is a schematic circuit diagram of an input/output interface of a reference node according to one embodiment of the present disclosure.

FIG. 4C is a schematic circuit diagram of an input/output interface 350 of a reference node 210 according to one embodiment of the present disclosure.

As shown, the X1 and X2 are electrical data bus 220. For example, X1 and X2 may be coaxial cables. A coaxial cable X1 may be a cable for receiving data and a coaxial cable X2 may be a cable for transmitting data.

A conductor line LINE is used to carry data. In some embodiments, the conductor line LINE carries both power and data. Under this configuration, the overall circuit scheme may be simplified. However, in other embodiments, there may be separate lines for power and data and other variations may be possible.

In FIG. 4C, there are two grounds (e.g., GND1 and GND2). One of the grounds is an electrical ground GND1 and the other is the test ground GND2 connected to the metal pipeline 240 (e.g., the metallic pipeline). In some embodiments, the potential of the electrical ground GND1 and the test ground GND2 may not be the same. There may be some resistances in the coaxial cables X1, X2 so these resistances has to be calibrated.

In some embodiments, the diode D2 supplies power provided through the conductor line LINE to a voltage regulator and as well as the rest of the connected components.

The Data_In terminal is connected to a buffer U7 and a diode array D3. The diode array D3 and the resistor R2 is present to avoid supplying high voltage into the buffer U7. In some embodiments, the function can be considered as a level shifter. The buffer U7 includes a Schmitt trigger. In some embodiments, the default may be set to a high signal (e.g., high voltage) when no data is being transmitted.

For transmitting data, the Data_Out terminal is connected to an inverting buffer U6 and the MOSFET Q1 which shorts the power conductor LINE to the local electrical ground GND1 producing a low voltage pulse on the conductor line LINE. Further, by sending a series of these pulses, the reference node 210 may communicate data. In particular, when the gate of the MOSFET Q1 goes ON, namely the output is high. For example, here, the conductor line LINE is pulled down to the ground GND1 and then it is possible to pull the data in and out. Moreover, there is some resistance in the computer processor assembly 200 end in line with the power circuit (not the resistance R2), which also makes it possible for the MOSFET Q1 to pull the signal down. In some embodiments, a resistance R5 may be arranged between the MOSFET Q1 and the inverting buffer U6. For example, the value of the resistance R5 may be 100Ω.

In further embodiments, the conductor line LINE which is also the power line may be modified to send data. When doing so, the low pulses are short enough to make this circuit non-power intensive.

In some embodiments, this circuit showing the input/output interface occurs in both in the reference node and the computer processor assembly.

In some cases where the farthest reference nodes 210 on the electrical data bus 220 is further than a threshold distance, it may be beneficial to separate out the power line and the data line. For example, if the farthest reference node 210 from the computer processor assembly 200 is about 5 miles long, separating the power line and the data line may be beneficial. That is, in some embodiments, a single line or wire may be used for both power and data, and in other embodiments, two separate lines or wires may be used for each power and data.

In one or more embodiments, the power source includes a DC power. For example, to transmit data through the power line, the DC signals may be modulated to go to zero at some clock rate or at some data rate.

The capacitance C4 and C5 connected at one end of the diode D2 have to have sufficient capacitance to hold up the controller 310 while that is being shorted. That is, the capacitors C4 and C5 may hold the voltage at the controller 310. The power supplied herein is also used to drive the power for the controller 310.

Computer Processor Assembly Composition

Figure 5:
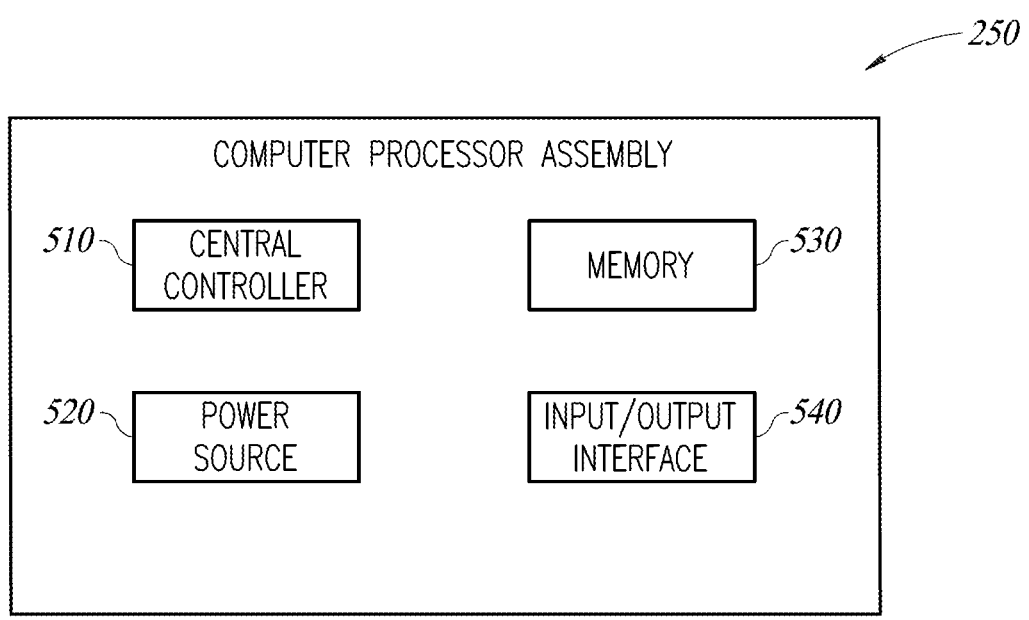
FIG. 5 is a block diagram of a computer processor assembly according to one or more embodiments of the present disclosure.

FIG. 5 is a block diagram of a computer processor assembly 250 according to one or more embodiments of the present disclosure.

The computer processor assembly 200 includes a central controller 510, a power source 520, a central memory 530, and a central input/output interface 540. The computer processor assembly 200 may include additional components as needed such as a rectifier, level shifter, and so forth. The components of the computer processor assembly 200 are not limited to the components shown in the drawings.

The central controller 510 is operatively coupled to the power source 520. The power source 520 is capable of supplying power to the reference nodes 210 on the electrical data bus 220 based on the instructions of the central controller 510.

The central controller 510 may include any electrical circuitry, features, components, an assembly of electronic components or the like configured to perform the various operations of the data collecting and control features as described herein. For example, the central controller 510 may include any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of executing the functions described herein. For example, the central controller 510 may be implemented using a Raspberry Pi.

In some embodiments, the central controller 510 may be included in or otherwise implemented by processing circuitry such as a microprocessor, microcontroller, integrated circuit, chip, microchip or the like.

The central controller 510 may be connected to a communication bus. The central controller 510 may also include a central memory 530. The central memory 530 may include Random Access Memory (RAM), Read Only Memory (ROM), a hard disk drive or a removable storage drive such as an optical disk drive, solid state disk drive (e.g., flash RAM), and the like. The central memory 530 may also be other similar means for loading computer programs or other instructions into the computer or processor.

The central memory 530 locally stores the data collected from some or all of the reference nodes 210 during an operation cycle. For example, when the electrical data bus 220 is powered on through the power source 520 during the operation cycle, the reference nodes 210 gather voltage data at their respective locations and stores it in their respective memories 340. The central controller 510 may request the reference nodes 210 to transmit back the data collected and stored in their memories 340. When the data from the reference nodes 210 are all collected, it is stored in the central memory 530 of the computer processor assembly 200. When the operation cycle ends and the power source 520 supplied to the electrical data bus 220 is cut off, the reference nodes 210 sits along the electrical data bus 220 without collecting data. In some embodiments, because the memories 340 utilized in the reference nodes 210 are volatile, powering off the power source 520 would erase the previously collected data in the memories 340. However, because all of the data from the respective reference nodes 210 are transferred and stored in the central memory 530, no data is lost or omitted.

In one or more embodiments, the data collected from the sensor 320 includes the electric potential between the metal pipeline 240 and the reference electrode 330. However, this data is not associated with parameters associated with the corrosivity of the metal pipeline. Further, in some cases, the data stored in the local memory 340 of the reference sensor assemblies 210 may not include corrosivity information of the metal pipeline 240.

The central input/output interface 540 provides electrical connections between the computer processor assembly 200 and the reference nodes 210. The details of the central input/output interface 540 will be described in connection with FIG. 6B.

Computer Processor Assembly Circuits

Figure 6A:
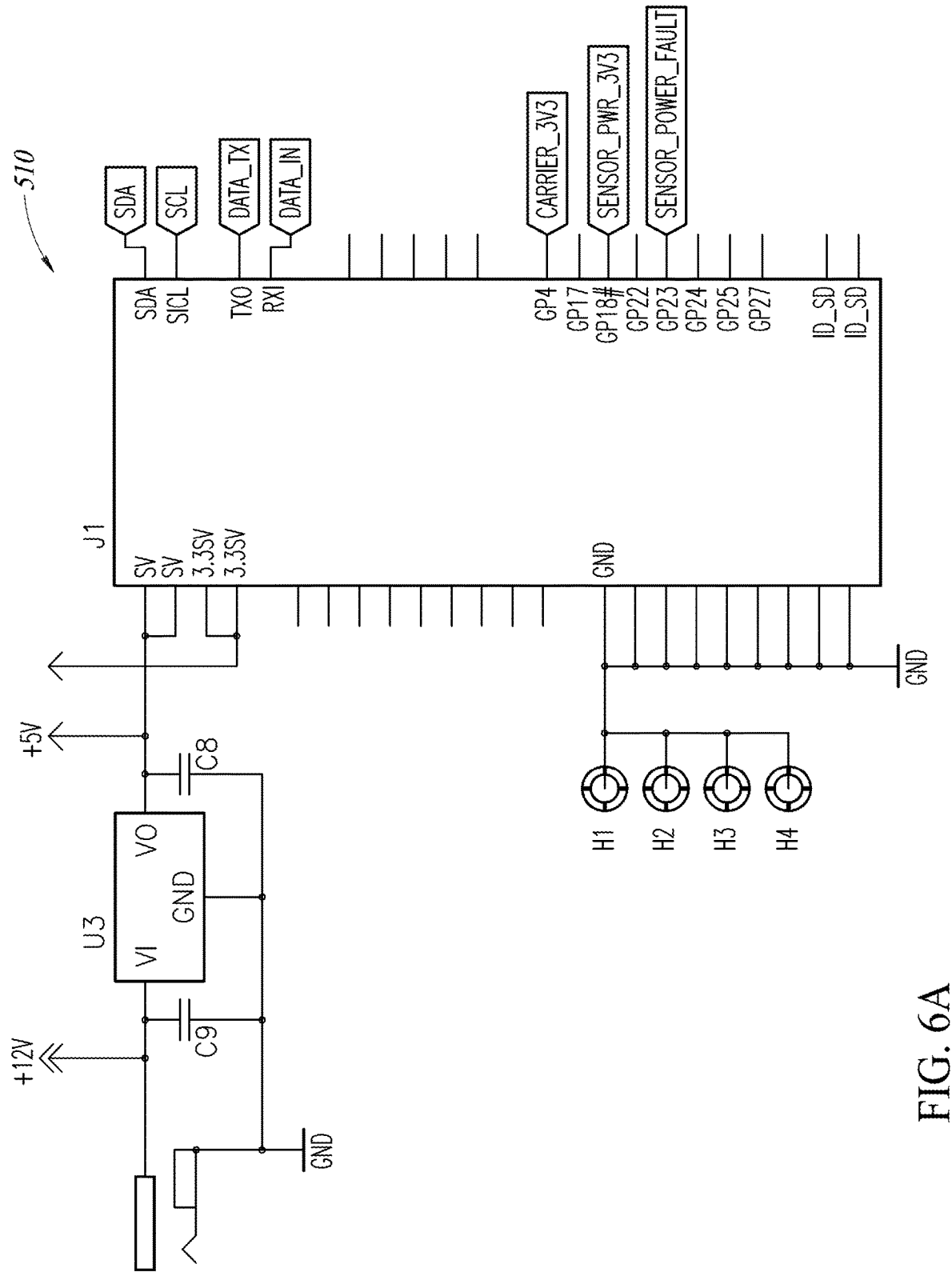
FIG. 6A is a schematic circuit diagram of a central controller of a computer processor assembly according to one embodiment of the present disclosure.
Figure 6B:
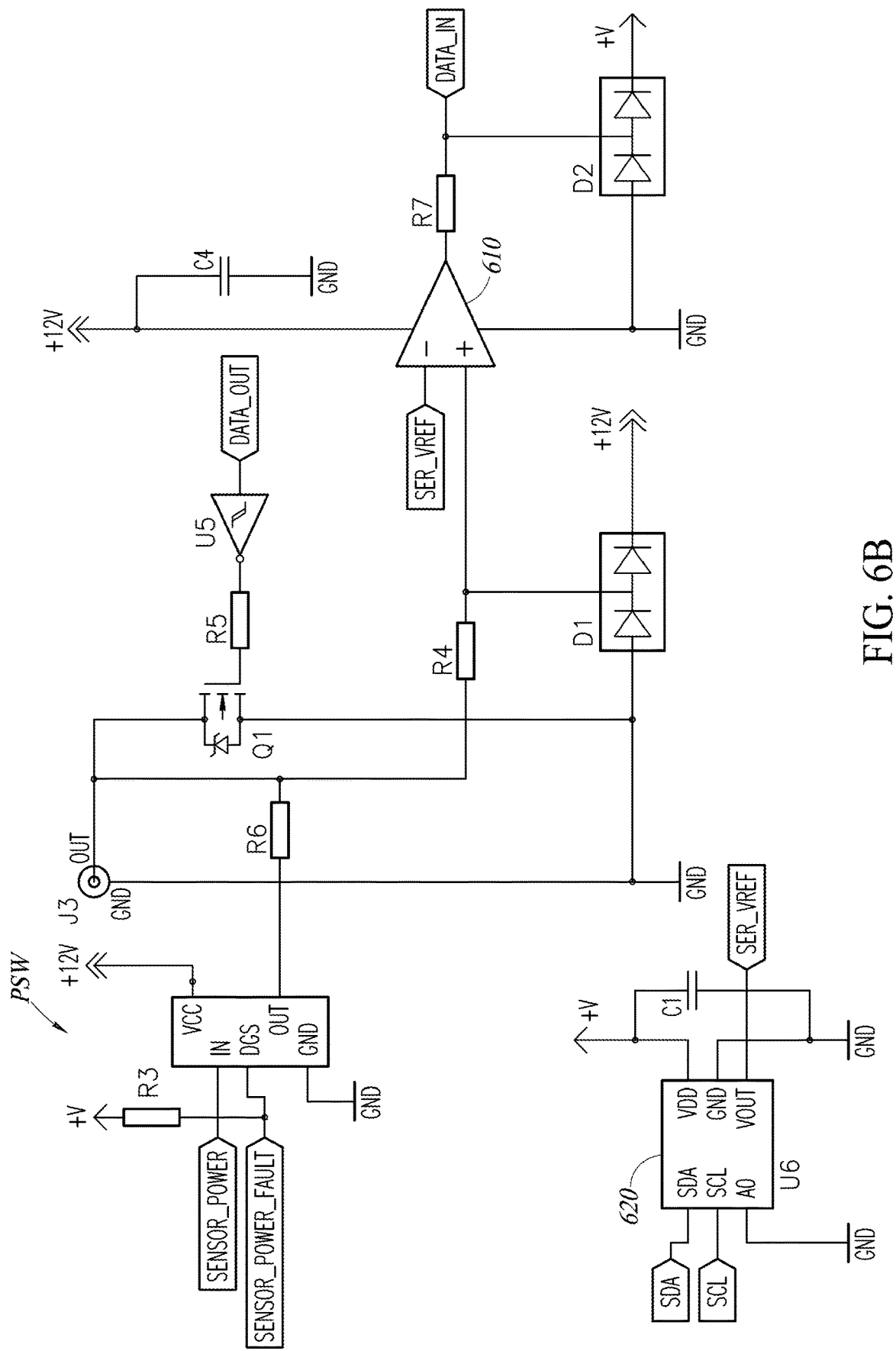
FIG. 6B is a schematic circuit diagram of a central input/output interface of a computer processor assembly according to one embodiment of the present disclosure.
Figure 6C:
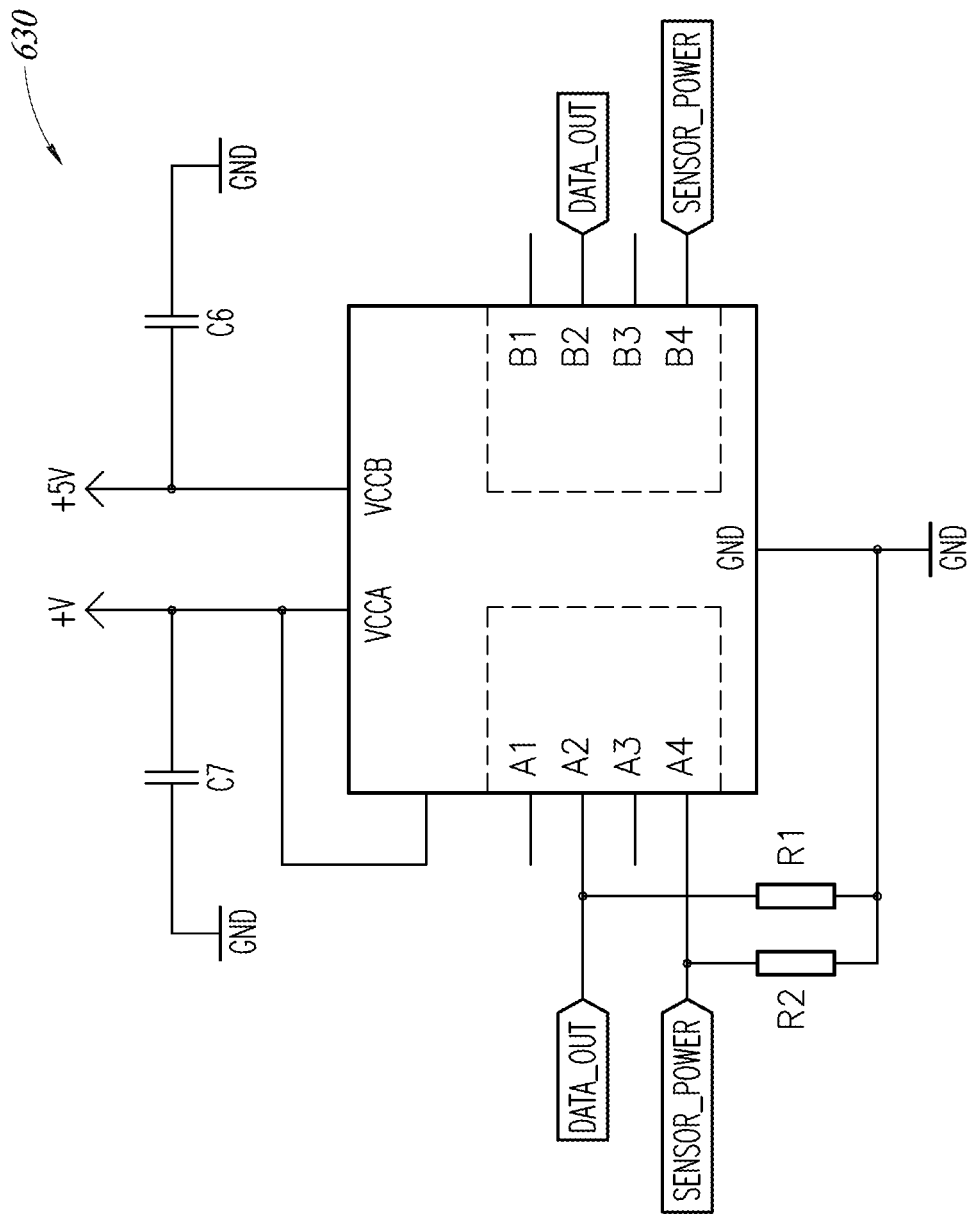
FIG. 6C is a schematic circuit diagram of a level shifter of a computer processor assembly according to one embodiment of the present disclosure.

FIG. 6A is a schematic circuit diagram of a central controller 510 of a computer processor assembly 250 according to one embodiment of the present disclosure. There are many different possible circuits, structures and designs for a central controller 510 and related circuits according to the invention and FIGS. 6A, 6B, and 6C provide acceptable examples of the many that could be made according to the principles of the present invention.

The central controller 510 controls the input and output of data signals and controls the supply of power signals. The central controller 510 generally operates at a higher voltage than the controller 310 in the reference node 210 as the central controller 510 requires more power to perform the various operations of the sensor system according to the present disclosure. For example, in one embodiment, the central controller 510 may operate at nominal +12V and the controller 310 may operate at +5V. However, these values are provided merely as an example and other voltage levels may be utilized.

In addition, the central controller 510 provides power via the power source 520 by a nominal 12V and sends it out to the electrical data bus 220. In one or more embodiments, each reference node 210 has a linear voltage regulator to turn the 12V to 5V. That is, the 12V is provided to the power conductor line LINE in FIG. 4C.

The central controller 510 includes a Tx0 pin which is configured to transmit data and a Rx1 pin which is configured to receive data.

The central controller 510 includes a one or more pins connected to ground GND. Tx0 pin which is configured to transmit data and a Rx1 pin which is configured to receive data. In addition, the central controller 510 includes a SDA pin, a SCL pin, a sensor power pin, and a sensor power fault pin. These pins will be further explained in connection to FIGS. 6B and 6C.

FIG. 6B is a schematic circuit diagram of a central input/output interface of a computer processor assembly according to one embodiment of the present disclosure.

As shown, node J3 indicates the connection (or a power connection) from the computer processor assembly 200 to the electrical data bus 220. A power switch PSW is connected to the J3 node via a resistor R6. In one embodiment, the resistance of R6 is about 10Ω. This resistance is large enough so that all the nodes can pull it down sufficiently enough to be sensed. The power switch PSW has an IN pin and a DGS pin. The IN pin is connected to the sensor power pin of the central controller 510. The DGS pin is connected to the sensor power fault pin of the central controller 510.

For transmitting, the configuration is substantially similar to the configuration that was shown with respect to the controller's data transmit configuration as shown in FIG. 4C). For example, the Data_Out terminal is connected to an inverting buffer U5 and the MOSFET Q1 which shorts the power connection at node J3 to the electrical ground GND. In some embodiments, a resistance R5 may be arranged between the MOSFET Q1 and the inverting buffer U6. For example, the value of the resistance R5 may be 100Ω.

For receiving, the configuration is different from the configuration that was shown with respect to the controller's data receive configuration as shown in FIG. 4C). Here, instead of having a Schmitt trigger, a comparator 610 is used. The inverting terminal of the comparator 610 is connected to a SER-Vref (e.g., serial voltage reference). The non-inverting terminal of the comparator 610 is connected to the power connection at node J3 through a resistance R4.

The Data_In terminal is connected to the resistance R4 and a diode array D1 via the comparator 610. The diode array D1 and the resistor R4 is present to avoid supplying high voltage into the comparator 610.

The serial voltage reference SER-Vref is supplied to the inverting terminal of the comparator 610 through a reference generator 620. The reference generator 620 includes an SDA pin and an SCL pin. The SDA pin and the SCL pin of the reference generator 620 is connected to the corresponding SDA pin and the SCL pin of the central controller 510. The reference generator 620 is configured to set the threshold so that even if a lengthy electrical data bus 220 is employed, the reference node 210 that is farthest away may sense data.

The signal supplied to Data_In is supplied to the Rx1 pin of the central controller 510.

To transmit data, the power connection or the center conductor at node J3 is shorted to the ground GND and every other reference node 210 along the electrical data bus 220 may be able to determine that voltage drop and may accordingly interpret the signal.

FIG. 6C is a schematic circuit diagram of a level shifter of a computer processor assembly according to one embodiment of the present disclosure.

A level shifter 630 is utilized so that the sensor system at the reference nodes 210 runs at +5V. The level shifter 630 may have A1 to A4 pins and B1 to B4 pins. The A2 pin is connected to the Data_Out terminal and the B2 pin is connected to the Data_Out terminal. The A4 pin is connected to the sensor power pin and the B4 pin is also connected to the sensor power pin. The VccA pin is connected to a selected voltage source and the VccB pin is connected to +5V.

CP Evaluation Workflow

Figure 7:
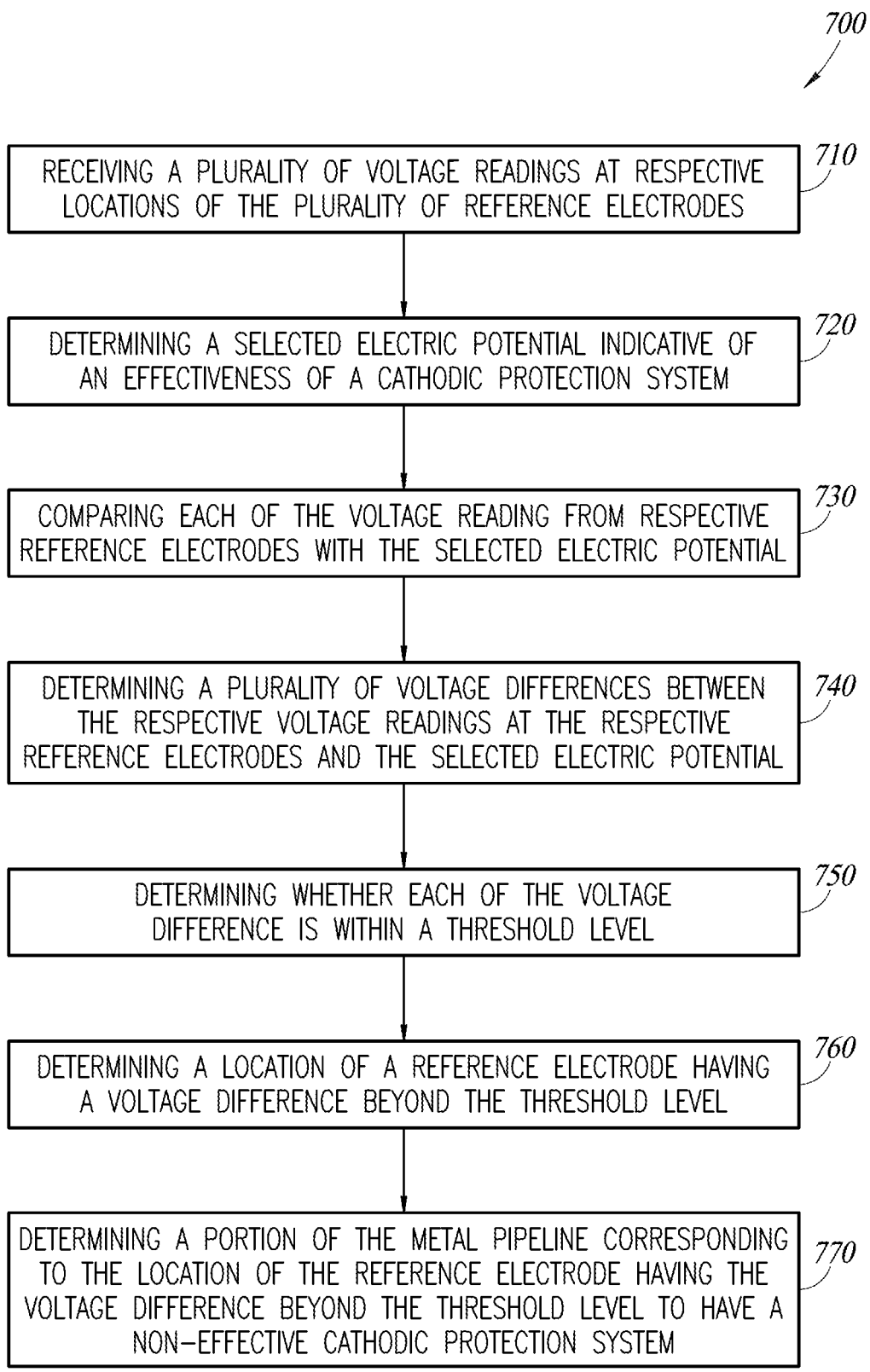
FIG. 7 is a flow chart of a method of evaluating a cathodic protection system according to some embodiments of the present disclosure.

FIG. 7 is a flow chart of a method of evaluating a cathodic protection system according to some embodiments of the present disclosure.

The method 700 of evaluating a cathodic protection system protecting the metal pipeline from corrosion includes receiving, using reference electrodes, a plurality of voltage readings at respective locations of the plurality of reference electrodes (see Step 710). The reference electrodes are adjacently positioned to a metal pipeline, and the reference electrodes and the metal pipeline are buried below the surface of the earth. Here, the voltage readings include electric potential measured between the reference electrode and the metal pipeline.

The method 700 includes determining a selected electric potential indicative of an effectiveness of the cathodic protection system (see Step 720). As described above, a measured potential or polarization of the protected object (namely, the metal pipeline) is indicative of the level of cathodic protection received by the metal pipeline. For example, the industry standard minimum criterion is −850 mV relative to $Cu/CuSO_4$ electrode. This can be one selected electric potential indicative of the effectiveness of the cathodic protection system that meets the industry standards. However, other measurements and criterion according to other standards may also be selected. That is, the effectiveness of the cathodic protection system may be shown using the electric potential through the polarization decay. Here, the industry standard minimum criterion is 100 mV. Accordingly, depending on the standards, the selected electric potential showing the efficacy of the cathodic protection system may vary.

The method 700 includes comparing each of the voltage reading from respective reference electrodes with the selected electric potential (see Step 730). The method 700 includes determining a plurality of voltage differences between the respective voltage readings at the respective reference electrodes and the selected electric potential; and (see Step 740).

The method 700 further includes determining whether each of the voltage difference is within a threshold level (see Step 750). For example, in some cases, the voltage reading obtained using the reference electrode may be −840 mV with a $Cu/CuSO_4$ electrode. In some cases, if the voltage difference is less than about 0.5%, the sensor system according to the present disclosure may determine that the voltage reading is within the acceptable threshold level. Further, the sensor system may determine that the measured values that is within the threshold level is meeting the industry standards and ensuring the effectiveness of the cathodic protection system. However, other more stringent threshold levels may be selected and 0.5% voltage difference is merely provided as an example.

The method 700 includes determining a location of a reference electrode having a voltage difference beyond the threshold level (see Step 760). For example, if one of the reference electrode, the third reference node 210c, shows voltage readings that is outside the threshold level, such location may be identified by the computer processor assembly. The computer processor assembly is configured to identify the location of each reference electrodes through an address scheme and if one of the reference electrodes deviates from the selected electric potential according to the standards (e.g., −850 mV), it may output said location of the reference electrode.

The method 700 includes determining a portion of the metal pipeline corresponding to the location of the reference electrode having the voltage difference beyond the threshold level to have a non-effective cathodic protection system (see Step 770). That is, the sensor system can accurately identify which section of the metal pipeline is not being protected by the cathodic protection system.

In some embodiments, the method of receiving the plurality of voltage readings at respective locations of the plurality of reference electrodes may further include the following steps. The method may include supplying power to the plurality of reference electrodes for a selected period of time via an electrical data bus. In response to the power supplied to the reference electrodes, the method may receive the voltage readings at respective locations of the reference electrodes for the selected period of time. The received voltage readings may be stored in a memory adjacent to the reference electrode collected during the selected period of time. The power is provided for a selected period of time to enable the sensor system to collect data only during that period of time. This protects the durability of the reference sensor assemblies buried under the surface of the earth. In practice, these reference sensor assemblies will be buried concurrently with the metal pipelines or may be buried subsequently any time after the metal pipeline is installed. However, once buried and installed under the soil, these reference sensor assemblies may stay buried for a period of time (e.g., 1 year, 3 years, or 10 years, or any other period). In this regard, ensuring the durability and longevity of the components of the reference sensor assemblies is beneficial. Accordingly, the reference sensor assemblies may be intermittently powered on to collect data when only it is necessary.

In some embodiments, the method may further include the steps of transmitting stored voltage readings to a main controller of the computer processor assembly. Here, the main controller is operatively coupled to the local controller inside the reference sensor assemblies. The main controller is configured to supply power to the local controller via the electrical data bus, and the main controller is connected at one end of the electrical data bus.

In some embodiments, the method may further include the steps of stopping a reception of the plurality of voltage readings in response to the power to the reference electrodes being turned off. When power is turned off, the previously stored voltage readings in the memory may be removed.

Central Controller Composition

Figure 8:
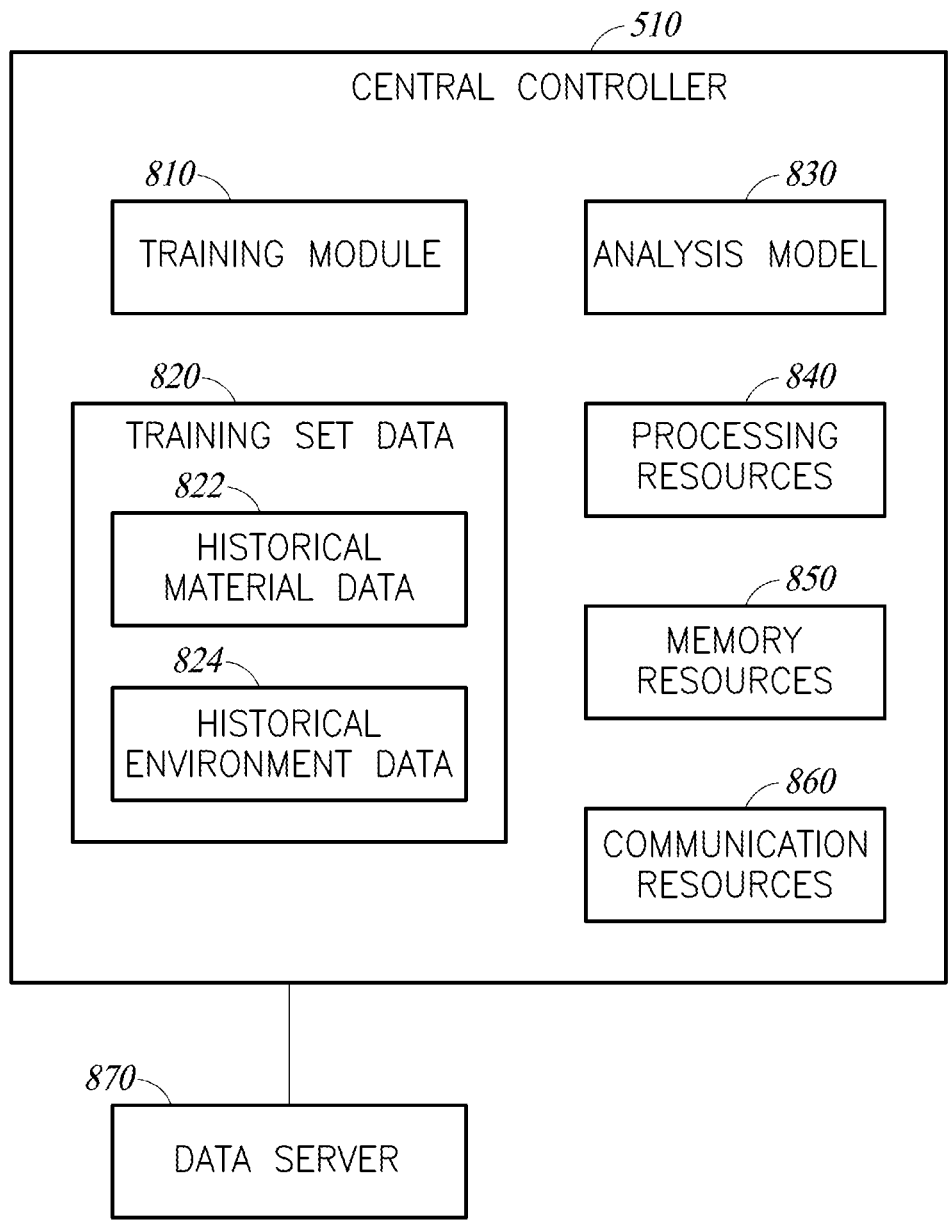
FIG. 8 is a block diagram of a central controller of FIG. 5, according to one embodiment.

FIG. 8 is a block diagram of the central controller 510 of FIG. 5, according to one embodiment. The central controller 510 is configured to control automatic operation of power supply, automatic data collection through reference nodes and other operations, according to one embodiment. The central controller 510 utilizes machine learning to adjust parameters for the above mentioned automatic operations. The central controller 510 can adjust parameters for the various operations so that efficiency can be improved. The various parameters will be further detailed in connection with FIG. 9.

In one embodiment, the central controller 510 includes an analysis model 830 and a training module 810. The training module 810 trains the analysis model 830 with a machine learning process. The machine learning process trains the analysis model 830 so that the various automatic operations can be efficiently performed.

The parameters that may be used to train the analysis model 830 through the training module 810 includes, but are not limited to, historical data patterns of electric potential from a specific reference node at a specific location, historical data patterns of corrosivity in a specific location, historical data patterns of electric potential associated with type of electrolyte (e.g., soil, water, air, or the like), historical data patterns of electric potential based on the type of coating of the metal pipeline, historical data patterns of electric potential based on the type of material used for the metal pipeline, soil resistivity patterns for a specific location, historical data patterns of decaying rate of metal pipelines, historical environment conditions at a specific location that affects the electrolyte (e.g., precipitation, climate, or the like).

A soil resistivity can be determined by applying a potential difference between a first electrode and a second electrode and measuring the resulting current density, or by forcing or otherwise providing a current thereto and measuring the resulting potential. For example, a high-frequency oscillation forcing signal or a steady forcing signal may be used. The measurement can be repeated on a regular basis to allow for seasonal or weather-related changes in the resistivity of soil or another electrolyte. For example, high-frequency oscillation forcing signal may refer to a forcing signal with a frequency of about 1 Hz or greater, preferably about 100 Hz or greater, and more preferably about 500 Hz or greater. In some examples, the high-frequency oscillation forcing signal can have a frequency within the range of 100-10,000 Hz.

Although the training module 810 is shown as being separate from the analysis model 830, in practice, the training module 810 may be part of the analysis model 830.

The central controller 510 includes, or stores, training set data 820. The training set data 820 includes historical material data 822 and historical environment data 824. The historical material data 822 includes data related to materials involved in the data collecting process. For example, historical data patterns of electric potential associated with type of electrolyte (e.g., soil, water, air, or the like), historical data patterns of electric potential based on the type of coating of the metal pipeline, historical data patterns of electric potential based on the type of material used for the metal pipeline, soil resistivity patterns for a specific location, historical data patterns of decaying rate of metal pipelines, historical data patterns of electric potential with respect to the type/material of reference electrodes, etc. may be included. The historical environment data 824 includes data related to conditions or parameters during the data collection process. For example, historical data patterns of electric potential from a specific reference node at a specific location, historical data patterns of corrosivity in a specific location, historical environment conditions at a specific location that affects the electrolyte (e.g., precipitation, climate, or the like), soil resistivity patterns for a specific location, the data collecting time frame as required by various government standards and regulations (e.g., once every six months, twice a month, or any other period set by the Federal or any other regulations), the data collecting sections of metal pipelines as required by various government standards and regulations (e.g., 10% of the entire pipeline has to be inspected in 6 months, 20% of the pipeline has to be inspected in a year, or the like), etc. may be included. As will be set forth in more detail below, the training module 810 utilizes the historical material data 822 and the historical environment data 824 to train the analysis model 830 with a machine learning process.

In one embodiment, the training set data 820 links the historical material data 822 with the historical environment data 824. By linking the two data set 822, 824, the central controller 510 may be more efficient and accurate in producing automated reports that conform to the Federal standards. For example, with the use of the machine learning process, the central controller 510 may power up automatically the reference nodes and collect electric potentials according to the timelines set forth by Federal standards and would also automatically survey the portions of the metal pipeline that has to be inspected in this cycle. In this way, no manual involvement may be required during the whole power supplying process and data collecting process.

In one embodiment the analysis model 830 includes a neural network. Training of the analysis model 830 will be described in relation to a neural network. However, other types of analysis models or algorithms can be used without departing from the scope of the present disclosure. The training module 810 utilizes the training set data 820 to train the neural network with a machine learning process. During the training process, the neural network receives, as input, historical environment data 824 from the training set data. During the training process, the neural network outputs predicted data for each relevant parameter. For example, for the historical data patterns of electric potential based on the type of material used for the metal pipeline, the neural network may output the time for repairing either the pipeline itself or the cathodic protection system protecting the pipeline based on the type of material of the pipeline, the age of the material, the decay rate of the material, the data trend of electric potential based on the type, age, decay rate of the pipeline material. The training process trains the neural network to generate predicted repair time data.

In one embodiment, the neural network includes a plurality of neural layers. The various neural layers include neurons that define one or more internal functions. The internal functions are based on weighting values associated with neurons of each neural layer of the neural network. During training, the central controller 510 compares, for each set of historical material data 822, the predicted historical material data to the actual historical material data associated with the data collection process. The control system generates an error function indicating how closely the predicted data matches the historical material data. The central controller 510 then adjusts the internal functions of the neural network. Because the neural network generates predicted data based on the internal functions, adjusting the internal functions will result in the generation of different predicted V data for a same set of historical material data 822. Adjusting the internal functions can result in predicted data that produces larger error functions (worse matching to the historical material data 822) or smaller error functions (better matching to the historical material data 822). The historical environment data 824 is provided to the neural network and undergoes the training process as mentioned above. The training module 810 again adjusts the internal functions of the neural network based on the historical environment data 824. This process is repeated for both data sets 822, 824 in a very large number of iterations of monitoring the error functions and adjusting the internal functions of the neural network until a set of internal functions is found that results in predicted data that matches the historical material data 822 and the historical environment data 824 across the entire training set.

At the beginning of the training process, the predicted data likely will not match the historical material data 822 or the historical environment data 824 very closely. However, as the training process proceeds through many iterations of adjusting the internal functions of the neural network, the errors functions will trend smaller and smaller until a set of internal functions is found that results in predicted data that match the historical material data 822 and the historical environment data 824. Identification of a set of internal functions that results in predicted data that matches the historical material data 822 and the historical environment data 824 corresponds to completion of the training process.

In one embodiment, the central controller 510 includes processing resources 840, memory resources 850, and communication resources 860. The data server 870 may be operatively coupled to the central controller 510 and share the data analysis process with the central controller 510. The processing resources 840 can include one or more controllers or processors. The processing resources 840 are configured to execute software instructions, process data, make parameter control decisions, perform signal processing, read data from memory, write data to memory, and to perform other processing operations. The processing resources 840 can include physical processing resources 840 located at the computer processor assembly. In some embodiments, the processing resources can include virtual processing resources 840 remote from the site of the computer processor assembly. That is, the processing resources 840 can include cloud-based processing resources including processors and servers accessed via one or more cloud computing platforms.

In one embodiment, the memory resources 850 can include one or more computer readable memories. The memory resources 850 are configured to store software instructions associated with the function of the control system and its components, including, but not limited to, the analysis model 830. The memory resources 850 can store data associated with the function of the central controller 510 and its components. The data can include the training set data 820, current process conditions data, and any other data associated with the operation of the central controller 510 or any of its components. In some embodiments, the memory resources 850 can include virtual memory resources located remotely from the computer processor assembly. That is, the memory resources 850 can include cloud-based memory resources accessed via one or more cloud computing platforms.

In one embodiment, the communication resources can include resources that enable the central controller 510 to communicate with components associated with the other systems including the data server 870. For example, the communication resources 860 can include wired and wireless communication resources that enable the central controller 510 to receive the sensor data associated with the data collection process through the reference nodes. The communication resources 860 in conjunction with the data server 870 can enable the central controller 510 to communicate with remote, external systems. For example, the data collected can be supplied to the central server of the entity managing and operating the pipelines. The communication resources 860 can include, or can facilitate communication via, one or more networks such as wire networks, wireless networks, the Internet, or an intranet. The communication resources 860 can enable components of the central controller 510 to communicate with each other.

In one embodiment, the analysis model 830 is implemented via the processing resources 840, the memory resources 850, and the communication resources 860 (or in some embodiments, the analysis model 830 may be implemented via the data server 870).

Model Training

Figure 9:
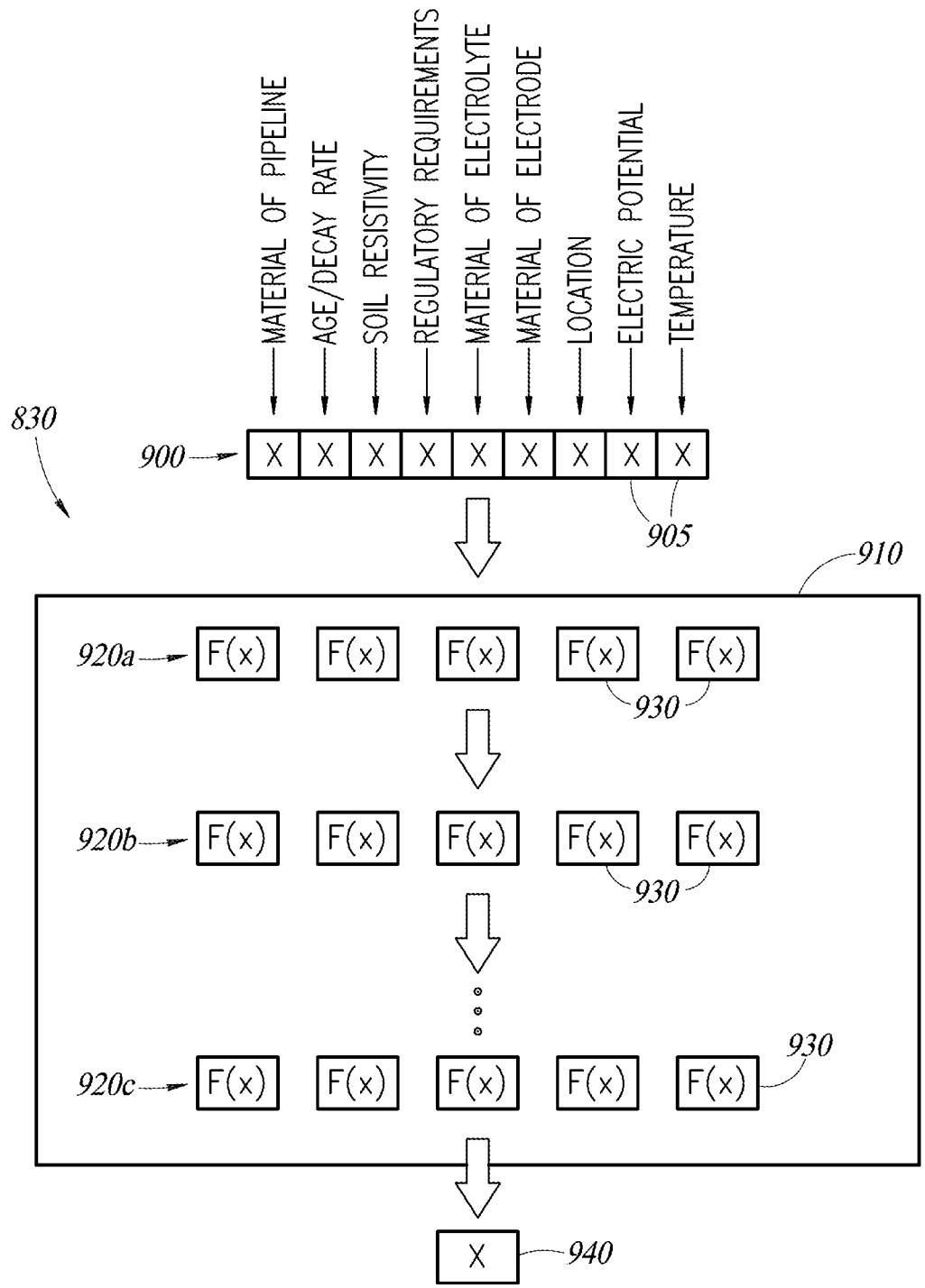
FIG. 9 is a block diagram of the analysis model of FIG. 8 illustrating operational aspects and training aspects of analysis model, according to one embodiment.

FIG. 9 is a block diagram of the analysis model 830 of FIG. 8 illustrating operational aspects and training aspects of analysis model 830, according to one embodiment. The analysis model 830 includes a neural network 160.

As described previously, the training set data 820 includes data related to an electric potential (or voltage) data collection process at the reference nodes. Each previously performed data collection process took place with particular process conditions. The process conditions for each data collection process are categorized into a respective process conditions vector 900. The process conditions vector 900 includes a plurality of data fields 166. Each data field 905 corresponds to a particular process condition.

The example of FIG. 9 illustrates a single process conditions vector 900 that will be passed to a processor 910 of the analysis model 830 during the training process. In the example, the process conditions vector 900 includes nine data fields 905. A first data field 905 corresponds to the type of material of the pipeline (including coating of the pipeline). A second data field 905 corresponds to the age (or decay rate or corrosivity) of the pipeline. A third data field 905 corresponds to the soil resistivity of the medium 230. A fourth data field 905 corresponds to the regulatory requirements including Federal standards and regulations for each location (state, country, etc.). A fifth data field 905 corresponds to the type of material of the electrolyte. The sixth data field 905 corresponds to the type of material of the reference electrode. The seventh data field 905 corresponds the location of where the reference electrodes are buried (may be buried in a location where it rains frequently during summer that may affect the condition of the electrolyte). An eighth data field 905 corresponds to the electric potential data pattern collected over time (including the fluctuations between the high voltage peaks and the low voltage peaks over time). A ninth data field corresponds to the temperature of the setting where the reference nodes are located (for example, if the pipelines are buried in a location where it has a high temperature, soil will likely be dry and will in turn impact the electrolyte function that the soil is serving). In practice, each process conditions vector 900 can include more or fewer data fields than are shown in FIG. 9 without departing from the scope of the present disclosure. Each process conditions vector 900 can include different types of process conditions without departing from the scope of the present disclosure. The particular process conditions illustrated in FIG. 9 are given only by way of example. Each process condition is represented by a numerical value in the corresponding data field 905.

The processor 910 includes a plurality of neural layers 920a-c. Each neural layer includes a plurality of nodes 930. Each node 930 can also be called a neuron. Each node 930 from the first neural layer 920a receives the data values for each data field from the process conditions vector 900. Accordingly, in the example of FIG. 9, each node 930 from the first neural layer 920a receives nine data values because the process conditions vector 900 has nine data fields. Each neuron 930 includes a respective internal mathematical function labeled F(x) in FIG. 9. Each node 930 of the first neural layer 920a generates a scalar value by applying the internal mathematical function F(x) to the data values from the data fields 905 of the process conditions vector 900. Further details regarding the internal mathematical functions F(x) are provided below.

In the example of FIG. 9, each neural layer 920a-920c in the processor 910 are fully connected layers. This means that each neural layer has the same number of nodes as the succeeding neural layer. In the example of FIG. 9, each neural layer 920a-920c includes five nodes. However, the neural layers of the processor 910 can include different numbers of layers than are shown in FIG. 9 without departing from the scope of the present disclosure.

Each node 930 of the second neural layer 920b receives the scalar values generated by each node 930 of the first neural layer 920a. Accordingly, in the example of FIG. 9 each node of the second neural layer 920b receives five scalar values because there are five nodes 930 in the first neural layer 920a. Each node 930 of the second neural layer 920b generates a scalar value by applying the respective internal mathematical function F(x) to the scalar values from the first neural layer 920a.

There may be one or more additional neural layers between the neural layer 920b and the neural layer 920c. The final neural layer 920c of the processor 910 receives the five scalar values from the five nodes of the previous neural layer (not shown). The output of the final neural layer is the predicted data 940.

During the machine learning process, the analysis model compares the predicted data values 940 to the actual measured values. The analysis model 830 generates an error value indicating the error or difference between the predicted data 940 and the actual measured data. The error value is utilized to train the processor 910.

The training of the processor 910 can be more fully understood by discussing the internal mathematical functions F(x). While all of the nodes 930 are labeled with an internal mathematical function F(x), the mathematical function F(x) of each node is unique. In one example, each internal mathematical function has the following form:

$$F(x) = x_1 * w_1 + x_2 * w_2 + \ldots x_n * w_1 + b.$$

In the equation above, each value $x_1$-$x_n$ corresponds to a data value received from a node 930 in the previous neural layer, or, in the case of the first neural layer 920a, each value $x_1$-$x_n$ corresponds to a respective data value from the data fields 905 of the process conditions vector 900. Accordingly, n for a given node is equal to the number of nodes in the previous neural layer. The values $w_1$-$w_n$ are scalar weighting values associated with a corresponding node from the previous layer. The analysis model 830 selects the values of the weighting values $w_1$-$w_n$. The constant b is a scalar biasing value and may also be multiplied by a weighting value. The value generated by a node 930 is based on the weighting values $w_1$-$w_n$. Accordingly, each node 930 has n weighting values $w_1$-$w_n$. Though not shown above, each function F(x) may also include an activation function. The sum set forth in the equation above is multiplied by the activation function. Examples of activation functions can include rectified linear unit functions, sigmoid functions, hyperbolic tension functions, or other types of activation functions. Each function F(x) may also include a transfer function.

After the error value has been calculated, the analysis model 830 adjusts the weighting values $w_1$-$w_n$ for the various nodes 930 of the various neural layers 920a-920c. After the analysis model 830 adjusts the weighting values $w_1$-$w_n$, the analysis model 830 again provides the process conditions vector 900 to the input neural layer 920a. Because the weighting values are different for the various nodes 930 of the analysis model 830, the predicted data 940 will be different than in the previous iteration. The analysis model 830 again generates an error value by comparing the actual removal efficiency to the predicted data 940.

The analysis model 830 again adjusts the weighting values $w_1$-$w_n$ associated with the various nodes 930. The analysis model 830 again processes the process conditions vector 900 and generates a predicted data 940 and associated error value. The training process includes adjusting the weighting values $w_1$-$w_n$ in iterations until the error value is minimized.

FIG. 9 illustrates a single process conditions vector 900 being passed to the processor 910. In practice, the training process includes passing a large number of process conditions vectors 900 through the analysis model 830, generating a predicted data 940 for each process conditions vector 900, and generating an associated error value for each predicted data 940. The training process can also include generating an aggregated error value indicating the average error for all the predicted data 940 for a batch of process conditions vectors 900. The analysis model 830 adjusts the weighting values $w_1$-$w_n$ after processing each batch of process conditions vectors 900. The training process continues until the average error across all process conditions vectors 900 is less than a selected threshold tolerance. When the average error is less than the selected threshold tolerance, the training of the processor 910 is complete and the analysis model is trained to accurately predict data 940 based on the process conditions.

A particular example of a neural network based analysis model 830 has been described in relation to FIG. 9. However, other types of neural network based analysis models, or analysis models of types other than neural networks can be utilized without departing from the scope of the present disclosure. Furthermore, the neural network can have different numbers of neural layers having different numbers of nodes without departing from the scope of the present disclosure.

Predictive Analysis

Figure 10:
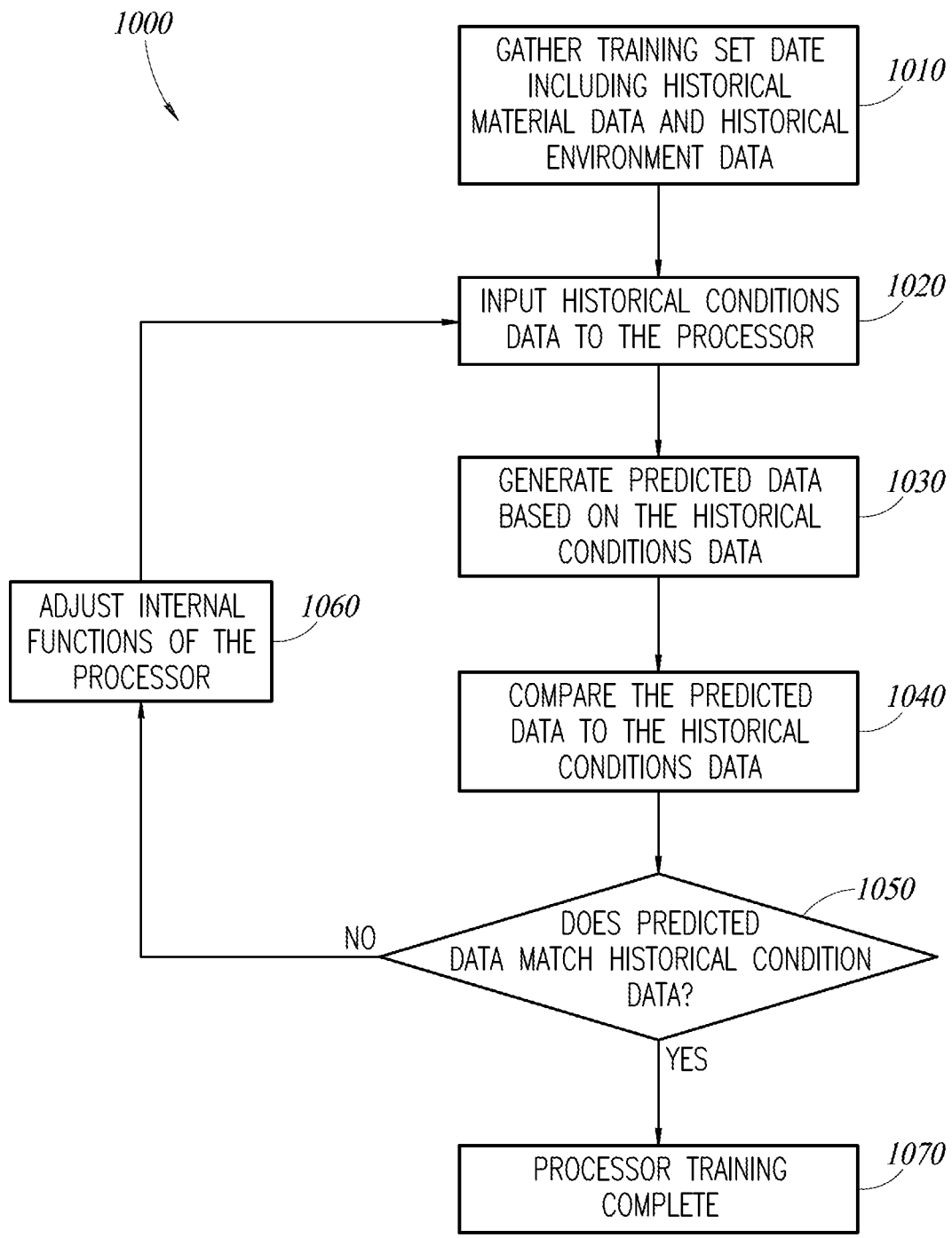
FIG. 10 is a flow diagram of a process for training a processor of an analysis model, such as the analysis model of FIGS. 8 and 9, to accurately predict data, according to one embodiment.

FIG. 10 is a flow diagram of a process 1000 for training a processor of an analysis model, such as the analysis model 830 of FIGS. 8 and 9, to accurately predict data, according to one embodiment. The various steps of the process 1000 can utilize components, processes, and techniques described in relation to FIGS. 8 and 9. Accordingly, FIG. 10 is described with reference to FIGS. 8 and 9.

At 1010, the process 1000 gathers training set data including historical material data 822 and historical environment data 824. This can be accomplished by using a data mining system or process. The data mining system or process can gather training set data by accessing one or more databases associated with the sensor assembly and the cathodic protection system as well as other systems working in conjunction with these systems and collecting and organizing various types of data contained in the one or more databases. The data mining system or process, or another system or process, can process and format the collected data in order to generate a training set data. The training set data 820 can include historical material data 822 and historical environment data 824 as described in relation to FIGS. 8 and 9.

At 1020, the process 1000 inputs historical conditions data to the processor 910. In one example, this can include inputting historical material data 822 and historical environment data 824 into the analysis model 830 with the training module 810 as described in relation to FIGS. 8 and 9. The historical conditions data can be provided in consecutive discrete sets to the processor 910. The historical conditions data can be provided as vectors to the processor 910. Each set can include one or more vectors formatted for reception processing by the processor 910. The historical conditions data can be provided to the processor 910 in other formats without departing from the scope of the present disclosure.

At 1030, the process 1000 generates predicted data based on historical conditions data. In particular, the analysis model 830 generates, for each set of historical conditions data, predicted data as described in FIG. 9.

At 1040, the predicted data is compared to the actual measured data. In particular, the predicted data for each set of historical conditions data is compared to the historical material data 822 (and the historical environment data 824) associated with that set of historical conditions data. The comparison can result in an error function indicating how closely the predicted data matches the historical material data 822 (and the historical environment data 824). This comparison is performed for each set of predicted data. In one embodiment, this process can include generating an aggregated error function or indication indicating how the totality of the predicted data compares to the historical material data 822 (and the historical environment data 824). These comparisons can be performed by the training module 810 or by the analysis model 830. The comparisons can include other types of functions or data than those described above without departing from the scope of the present disclosure.

At 1050, the process 1000 determines whether the predicted data matches the historical condition data based on the comparisons generated at step 1040. In one example, if the aggregate error function is greater than an error tolerance, then the process 1000 determines that the predicted data does not match the historical condition data. In one example, if the aggregate error function is less than an error tolerance, then the process 1000 determines that the predicted data does match the historical condition data.

In one embodiment, if the predicted data does not match the historical material data 822 822 (and the historical environment data 824) at step 1050, then the process proceeds to step 160. At step 1060, the process 1000 adjusts the internal functions associated with the analysis model 830. In one example, the training module 810 adjusts the internal functions associated with the processor 910. From step 1060, the process returns to step 1020. At step 1020, the historical conditions data is again provided to the analysis model 830. Because the internal functions of the processor 910 have been adjusted, the analysis model 830 will generate different predicted data than in the previous cycle. The process proceeds to steps 1030, 1040, and 1050 and the aggregate error is calculated. If the predicted data does not match the historical condition data, then the process returns to step 1060 and the internal functions of the processor 910 are adjusted again. This process proceeds in iterations until the processor 910 generates predicted data that matches the historical condition data.

In one embodiment, if the predicted data matches the historical condition data then process step 1050, in the process 1000, proceeds to 1070. At step 1070 training is complete. The processor 910 of the analysis model 830 is now ready to be utilized to predict data. The process 1000 can include other steps or arrangements of steps than shown and described herein without departing from the scope of the present disclosure.

By employing AI algorithms, the analysis of big data is facilitated. Further benefits includes a full suite of automated reports. The sensor system according to the present disclosure may allow the user to analyze the reports, review the performance of the cathodic protection system, and summarize alarm data on a periodic basis (or any random period). The automated data collecting with the use of AI technologies also facilitates the task of collecting voltage data (and current data) from cathodic protection rectifiers to assure proper corrosion protection system performance. Other technical benefits will be readily understood by a person of ordinary skill in the art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A sensor assembly of a cathodic protection system for a metal structure, the sensor assembly comprising:
    an electrical data bus positioned adjacent to the metal structure, the metal structure and the electrical data bus being within a same electrolyte;
    a plurality of reference sensor assemblies coupled to the electrical data bus, each of the plurality of reference sensor assemblies being spaced apart from each other, located within the same electrolyte as the metal structure, and spaced apart from the metal structure;
    a computer processor assembly operatively coupled to the electrical data bus and to the plurality of reference sensor assemblies via the electrical data bus, wherein the computer processor assembly includes:
        a power source configured to either permanently or intermittently supply power to the plurality of reference sensor assemblies through the electrical data bus; and a main controller configured to receive and process data received from the plurality of reference sensor assemblies, and wherein the main controller is further configured to:
receive a plurality of voltage readings at respective locations of the plurality of reference sensor assemblies, the reference sensor assemblies and the metal structure being contained within an electrolyte, the voltage readings including electric potential between the reference sensor assemblies and the metal structure protected by the cathodic protection system;
determine a selected electric potential indicative of an effectiveness of the cathodic protection system, wherein the effectiveness of the cathodic protection system protects the metal structure from corrosion;
compare each of the voltage readings from respective reference sensor assemblies with the selected electric potential;
determine a plurality of voltage differences between the respective voltage readings at the respective reference sensor assemblies and the selected electric potential; and
determine whether each of the voltage difference is within a threshold level.

2. The sensor assembly of claim 1, wherein the electrolyte includes soil that is part of the local earth surrounding the metal structure and
wherein each reference sensor assembly includes:
a reference electrode;
a sensor operatively coupled to the reference electrode, the sensor configured to detect an electric potential between the metal structure and the reference electrode; and
a local memory configured to store data collected from the sensor.

3. The sensor assembly of claim 2, wherein each reference sensor assembly further includes a local controller that is configured to set address schemes for identifying each reference sensor assembly, wherein the main controller in the computer processor assembly is configured to request and retrieve data from specific reference sensor assemblies among the plurality of reference sensor assemblies using the address schemes.

4. The sensor assembly of claim 2, further comprising a main memory, the main memory stores data collected from the reference sensor assemblies.

5. The sensor assembly of claim 4, wherein the data collected from the sensor including the electric potential between the metal structure and the reference electrode is not associated with parameters associated with the corrosivity of the metal structure.

6. The sensor assembly of claim 4, wherein the data stored in the local memory of the reference sensor assemblies does not include corrosivity information of the metal structure.

7. The sensor assembly of claim 2, wherein the computer processor assembly is coupled to one end of the electrical data bus, and the electrical data bus includes a data-carrying wire.

8. The sensor assembly of claim 1, wherein each of the plurality of reference sensor assemblies are spaced apart from each other by about 2 to 10 feet.

9. The sensor assembly of claim 1, wherein the reference sensor assemblies are closer to the metal structure than a boundary of the electrolyte.

10. The sensor assembly of claim 1, wherein the reference sensor assemblies are within about 5 feet of the metal structure.

11. The sensor assembly of claim 1, wherein the reference sensor assemblies are placed relative to global positioning coordinates.

12. A sensor system for evaluating a cathodic protection system protecting a metal structure, comprising:
an electrical data bus positioned adjacent to the metal structure, the metal structure and the electrical data bus being contained within an electrolyte, wherein the metal structure is operatively coupled to the cathodic protection system, wherein the cathodic protection system is configured to protect the metal structure from corrosion;
a plurality of reference sensor assemblies coupled to the electrical data bus, each of the plurality of reference sensor assemblies being spaced apart from each other, contained within an electrolyte and spaced apart from the metal structure; and
a computer processor assembly coupled to one end of the electrical data bus, wherein the computer processor assembly is operatively coupled to the plurality of reference sensor assemblies via the electrical data bus, and
wherein the computer processor assembly is configured to:
receive a plurality of voltage readings at respective locations of the plurality of reference sensor assemblies, the voltage readings including electric potential between the reference sensor assemblies and the metal structure protected by the cathodic protection system;
determine a selected electric potential indicative of an effectiveness of the cathodic protection system, wherein the effectiveness of the cathodic protection system protects the metal structure from corrosion;
compare each of the voltage readings from respective reference sensor assemblies with the selected electric potential;
determine a plurality of voltage differences between the respective voltage readings at the respective reference sensor assemblies and the selected electric potential; and
determine whether each of the voltage difference is within a threshold level.

13. The sensor system of claim 12, wherein each reference sensor assembly includes:
a sensor including a reference electrode, the sensor configured to detect the electric potential between the metal structure and the reference electrode;
a local memory configured to store data detected from the sensor; and
a local controller configured to process data and transmit the data via the electrical data bus.

14. The sensor system of claim 13, wherein the data detected from the sensor does not include measurements related to corrosion of the metal structure.

15. The sensor system of claim 13, wherein the computer processor assembly includes:
a power supply source configured to supply power to the plurality of reference sensor assemblies via the electrical data bus;
a main memory storing data transmitted from the local memory of each reference sensor assembly; and
a main controller configured to:

control the power supply source to the plurality of reference sensor assemblies for a selected period of time, wherein the reference sensor assemblies are configured to be powered during the selected period of time and collects data associated with electric potential between the metal structure and the reference electrode during the selected period of time;

transmit instructions to the local controller of the reference sensor assemblies for retrieving data during the selected period of time; and retrieve data collected from the reference sensor assemblies.

16. The sensor system of claim 15, wherein the reference sensor assemblies idly stand by without collecting data when it is out of the selected period of time.

17. A method of evaluating a cathodic protection system, comprising:

receiving, using a plurality of reference electrodes, a plurality of voltage readings at respective locations of the plurality of reference electrodes, wherein the plurality of reference electrodes are adjacently positioned to a metal structure, and the reference electrodes and the metal structure are contained within an electrolyte, wherein the voltage readings include electric potential between the reference electrodes and the metal structure protected by the cathodic protection system;

determining a selected electric potential indicative of an effectiveness of the cathodic protection system, wherein the effectiveness of the cathodic protection system protects the metal structure from corrosion;

comparing, using a local controller, each of the voltage readings from respective reference electrodes with the selected electric potential;

determining, using the local controller, a plurality of voltage differences between the respective voltage readings at the respective reference electrodes and the selected electric potential; and determining, using the local controller, whether each of the voltage difference is within a threshold level, wherein the local controller is positioned adjacent to each of the plurality of reference electrodes contained within the same electrolyte as the metal structure.

18. The method of claim 17, further comprising:

determining, using the local controller, a location of a reference electrode having a voltage difference beyond the threshold level; and determining a portion of the metal pipeline corresponding to the location of the reference electrode having the voltage difference beyond the threshold level to have a non-effective cathodic protection system.

19. The method of claim 17, wherein receiving the plurality of voltage readings at respective locations of the plurality of reference electrodes includes:

supplying power to the plurality of reference electrodes for a selected period of time via an electrical data bus;

in response to the power supplied to the plurality of reference electrodes:

receiving the plurality of voltage readings at respective locations of the plurality of reference electrodes for the selected period of time;

storing the voltage readings in a memory adjacent to the reference electrode collected during the selected period of time.

20. The method of claim 19, further comprising:

transmitting stored voltage readings to a main controller, wherein the main controller is operatively coupled to the local controller, wherein the main controller is configured to supply power to the local controller via the electrical data bus, and wherein the main controller is coupled at one end of the electrical data bus.

21. The method of claim 19, further comprising:

in response to the power supplied to the plurality of reference electrodes being terminated:

stopping a reception of the plurality of voltage readings; and removing previously stored voltage readings in the memory adjacent to the reference electrode.

22. The method of claim 19, further comprising:

selecting, using a main controller, at least one reference electrodes among the plurality of reference electrodes, wherein the main controller is operatively coupled to the local controller through a electrical data bus, the main controller is coupled at one end of the electrical data bus and the plurality of references electrodes are arranged along the electrical data bus;

requesting voltage readings at a selected reference electrode by the main controller;

in response to the request by the main controller, transmitting the voltage readings to the main controller from a memory coupled to the local controller;

comparing, using the main controller, each of the plurality of voltage differences with the selected electric potential.

* * * * *